US008281992B2

(12) United States Patent
Bando et al.

(10) Patent No.: US 8,281,992 B2
(45) Date of Patent: Oct. 9, 2012

(54) METHOD AND APPARATUS FOR MANAGING RESOURCES, AND COMPUTER-READABLE STORAGE MEDIUM FOR COMPUTER PROGRAM

(75) Inventors: Ryoji Bando, Sakai (JP); Takahiro Kouno, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 356 days.

(21) Appl. No.: 12/635,774

(22) Filed: Dec. 11, 2009

(65) Prior Publication Data
US 2010/0147945 A1 Jun. 17, 2010

(30) Foreign Application Priority Data
Dec. 12, 2008 (JP) ................. 2008-317703

(51) Int. Cl.
G06K 7/01 (2006.01)
(52) U.S. Cl. ............ 235/382.5; 235/382; 235/375; 235/380
(58) Field of Classification Search ........ 235/375–382.5
See application file for complete search history.

(56) References Cited

U.S. PATENT DOCUMENTS
5,629,508 A * 5/1997 Findley et al. ............... 235/382
6,298,441 B1 * 10/2001 Handelman et al. ......... 713/185

FOREIGN PATENT DOCUMENTS
| JP | 02-085483 | | 3/1990 |
| JP | 5-067258 | A | 3/1993 |
| JP | 2000-322529 | A | 11/2000 |
| JP | 2005-038236 | | 2/2005 |
| JP | 2007-094967 | A | 4/2007 |
| JP | 2008-262422 | | 10/2008 |

OTHER PUBLICATIONS

Notification of Reason(s) for Refusal dated Oct. 5, 2010, issued in the corresponding Japanese Patent Application No. 2008-317703, and an English Translation thereof.

* cited by examiner

*Primary Examiner* — Thien M Le
*Assistant Examiner* — Christle Marshall
(74) *Attorney, Agent, or Firm* — Buchanan Ingersoll & Rooney PC

(57) ABSTRACT

A method for managing a resource is provided. A personal card recording, thereon, a user identification code for identifying a user is issued to the user. A registration card recording, thereon, a registration code is prepared. The user identification code is stored in a temporary user storage portion when the user identification code and the registration code are read out, for user registration, from the personal card and the registration card respectively during a predetermined period. If the user identification code is read out from the personal card in order for the user to use the resource and the user identification code is stored in the temporary user storage portion, then the user is allowed to access the resource. If such user identification code is not stored in the temporary user storage portion, then the user is forbidden to access the resource.

12 Claims, 21 Drawing Sheets

| REGISTRATION CARD IDENTIFICATION CODE | ACCESS RIGHT | | | | | | |
|---|---|---|---|---|---|---|---|
| | PERIOD OF VALIDITY | NUMBER OF TIMES USED | REGISTERED RIGHT TRANSFER APPROVAL/ DISAPPROVAL | COLOR PRINTING | FAX TRANSMISSION | BOX | ... |
| A001 | 8 HOURS | 10 TIMES | NO | YES | YES | YES | ... |
| A002 | 24 HOURS | 25 TIMES | YES | NO | YES | YES | ... |
| A003 | 1 HOUR | 5 TIMES | NO | YES | NO | NO | ... |
| ... | ... | ... | ... | ... | ... | ... | ... |

| PERSONAL CARD IDENTIFICATION CODE | ACCESS RIGHT | | | | | | | |
|---|---|---|---|---|---|---|---|---|
| | EXPIRATION DATE AND TIME | NUMBER OF USES LEFT | REGISTERED RIGHT TRANSFER APPROVAL/ DISAPPROVAL | COLOR PRINTING | FAX TRANSMISSION | BOX | ... | REGISTRATION CARD IDENTIFICATION CODE |
| B001 | 2008/01/23 10:25 | 5 TIMES | NO | YES | YES | YES | ... | A001 |
| B002 | 2008/01/23 13:36 | 21 TIMES | YES | NO | YES | YES | ... | A002 |
| B003 | 2008/01/23 09:33 | 1 TIME | NO | YES | NO | NO | ... | A003 |
| ... | ... | ... | ... | ... | ... | ... | ... | ... |

| REGISTRATION CARD IDENTIFICATION CODE | FIRST AUTHENTICATION KEY | ISSUED AMOUNT | PERIOD OF VALIDITY | NUMBER OF TIMES USED | ACCESS RIGHT | | | | |
|---|---|---|---|---|---|---|---|---|---|
| | | | | | REGISTERED RIGHT TRANSFER APPROVAL/ DISAPPROVAL | COLOR PRINTING | FAX TRANSMISSION | BOX | ... |
| A001 | PARSMNJFK | 2 | 8 HOURS | 10 TIMES | NO | YES | YES | YES | ... |
| A002 | UDQVMISGL | 1 | 24 HOURS | 25 TIMES | YES | NO | YES | YES | ... |
| A003 | RDIATNEZC | 5 | 1 HOUR | 5 TIMES | NO | YES | NO | NO | ... |
| ... | ... | | ... | ... | ... | ... | ... | ... | ... |

8CA  8KA                                                              7S 7S 7S

METHOD AND APPARATUS FOR MANAGING RESOURCES, AND COMPUTER-READABLE STORAGE MEDIUM FOR COMPUTER PROGRAM

This application is based on Japanese patent application No. 2008-317703 filed on Dec. 12, 2008, the contents of which are hereby incorporated by reference.

BACKGROUND OF THE INVENTION

1. Field of the Invention

The present invention relates to a method, an apparatus, and the like for managing resources such as hardware resources and software resources.

2. Description of the Related Art

Image forming apparatuses having a variety of functions, such as copying, network printing, scanning, and faxing have recently come into widespread use. Such image forming apparatuses are sometimes called "multifunction devices", "Multi-Function Peripherals (MFPs)", or the like. The range of functions of the image forming apparatus will probably expand. The greater the number of functions of the image forming apparatus is, the more users use the image forming apparatus.

Such an image forming apparatus may sometimes deal with confidential information. Further, supplies such as copy paper and toner are needed to use such an image forming apparatus. Accordingly, in view of security management and reduction in running cost, a limit has been imposed on the range of users who can use an image forming apparatus. To be specific, a method has been employed by which only a specific user is given a right (access right) to use an image forming apparatus, and a person who does not have an access right is not allowed to use the image forming apparatus.

The use of such a method involves performing user authentication. There are disclosed techniques for user authentication by means of a card (Japanese Laid-open Patent Publication Nos. 5-067258, 2000-322529, and 2007-094967).

A security device disclosed in the English Abstract of Japanese Laid-open Patent Publication No. 5-067258 is an ID card-compatible security device for outputting an authentication signal based on information obtained by reading an ID card. The security device is configured of a storage portion for registering therein combinations of a plurality of ID cards; a reading portion for reading ID information on the ID card; and a control portion for outputting an authentication signal when the ID card is entered, the reading portion reads the ID information of the plurality of ID cards, and the ID information thus read and combination registration information stored in the storage portion correspond and satisfy a predetermined condition.

According to the technique disclosed in Japanese Laid-open Patent Publication No. 2000-322529, authentication is performed by using at least two cards of a main card and a slave card, a card reader for the main card, a personal identification number input device, an information communication device for the slave card, and an information processing device for verifying authentication. If authentication information on the main card, a personal identification number, and authentication information on the slave card, or information used for operating an authentication device is successfully identified, then it is deemed that authenticity of a legitimate user is verified.

An authentication system according to Japanese Laid-open Patent publication No. 2007-094967 is an authentication system that carries out an authentication process by using a first IC card and a second IC card. The authentication system is configured of the first IC card and the second IC card having functions of external communication, and a host device having a function of carrying out communication with the IC cards. The host device performs control such that the host device carries out communication only with the first IC card, and the second IC card carries out communication only with the first IC card. Frequencies of sub-carriers used in a communication mode between a reader/writer and the first IC card are different from those used in a communication mode between the first IC card and the second IC card.

A method for performing user authentication by using a card is convenient for a user who is given an access right, i.e., a registered user.

In view of the security, an access right should be given only to a user who regularly uses an image forming apparatus.

In such a case, however, if a user who is not given an access right to use an image forming apparatus but intends to use the same temporarily, it is necessary for an administrator to give an access right to such a user. It is burdensome for the administrator to perform an operation for granting an access right.

SUMMARY

The present disclosure is directed to solve the problems pointed out above, and therefore, an object of an embodiment of the present invention is, in a system for performing user authentication by using a portable recording medium such as a card, to grant an access right to a user who temporarily uses such a system more easily than is conventionally possible.

According to an aspect of the present invention, a method for managing a resource includes a step of providing a user with a first portable recording medium recording, thereon, a user identification code for identifying the user, a step of providing a second portable recording medium recording, thereon, a registration code, a step of storing the user identification code in a storage portion when the user identification code and the registration code are read out, for user registration, from the first portable recording medium and the second portable recording medium respectively during a predetermined period, and a step of allowing the user to access the resource if the user identification code is read out from the first portable recording medium in order for the user to use the resource and the user identification code thus read out is stored in the storage portion, and forbidding the user to access the resource if the user identification code is read out from the first portable recording medium in order for the user to use the resource and the user identification code thus read out is not stored in the storage portion.

Preferably, the step of storing may include storing, in the storage portion, the user identification code in association with the registration code that has been read out simultaneously with the user identification code during the predetermined period, and, after specifying a registration code to be invalidated, the step of allowing and forbidding may include, if the user identification code read out from the first portable recording medium is associated with the registration code to be invalidated, forbidding the user to access the resource independent of whether or not the user identification code is stored in the storage portion.

The method may further include a step of presetting an access right to the resource per the second portable recording medium. The step of allowing and forbidding may include allowing or forbidding the user to access the resource based on the access right preset on the second portable recording medium corresponding to the registration code associated with the user identification code.

According to another aspect of the present invention, a method for managing a resource includes a step of providing a first portable recording medium recording, thereon, a first key, a step of providing a user with a second portable recording medium, a step of storing, in a key storage portion, the first key that is currently valid, a step of generating a second key corresponding to the first key recorded on the first portable recording medium, and recording the second key onto the second portable recording medium when the first portable recording medium and the second portable recording are set, for user registration, on a reader/writer during a predetermined period, and a step of allowing the user to access the resource if the second key is read out from the second portable recording medium in order for the user to use the resource and the first key corresponding to the second key is stored in the key storage portion, and forbidding the user to access the resource if the second key is read out from the second portable recording medium in order for the user to use the resource and the first key corresponding to the second key is not stored in the key storage portion.

These and other characteristics and objects of the present invention will become more apparent by the following descriptions of preferred embodiments with reference to drawings.

BRIEF DESCRIPTION OF THE DRAWINGS

FIG. 4 is a diagram illustrating an example of a registration card database.

FIG. 5 is a diagram illustrating an example of a visiting employee user database.

FIG. 15 is a diagram illustrating an example of a registration card database.

DESCRIPTION OF THE PREFERRED EMBODIMENTS

[First Embodiment]

Figure 1:
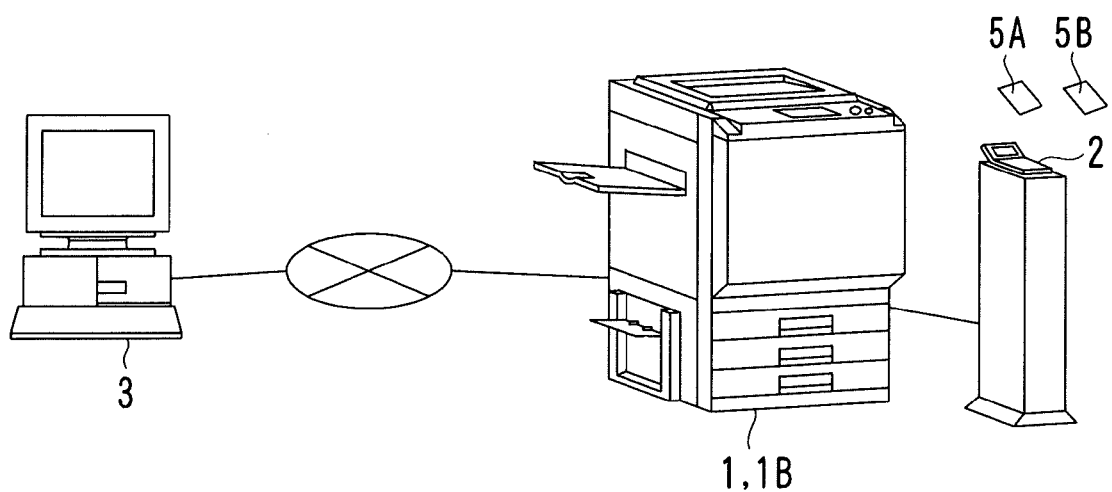
FIG. 1 is a diagram illustrating an example of a network system including an image forming apparatus.
Figure 2:
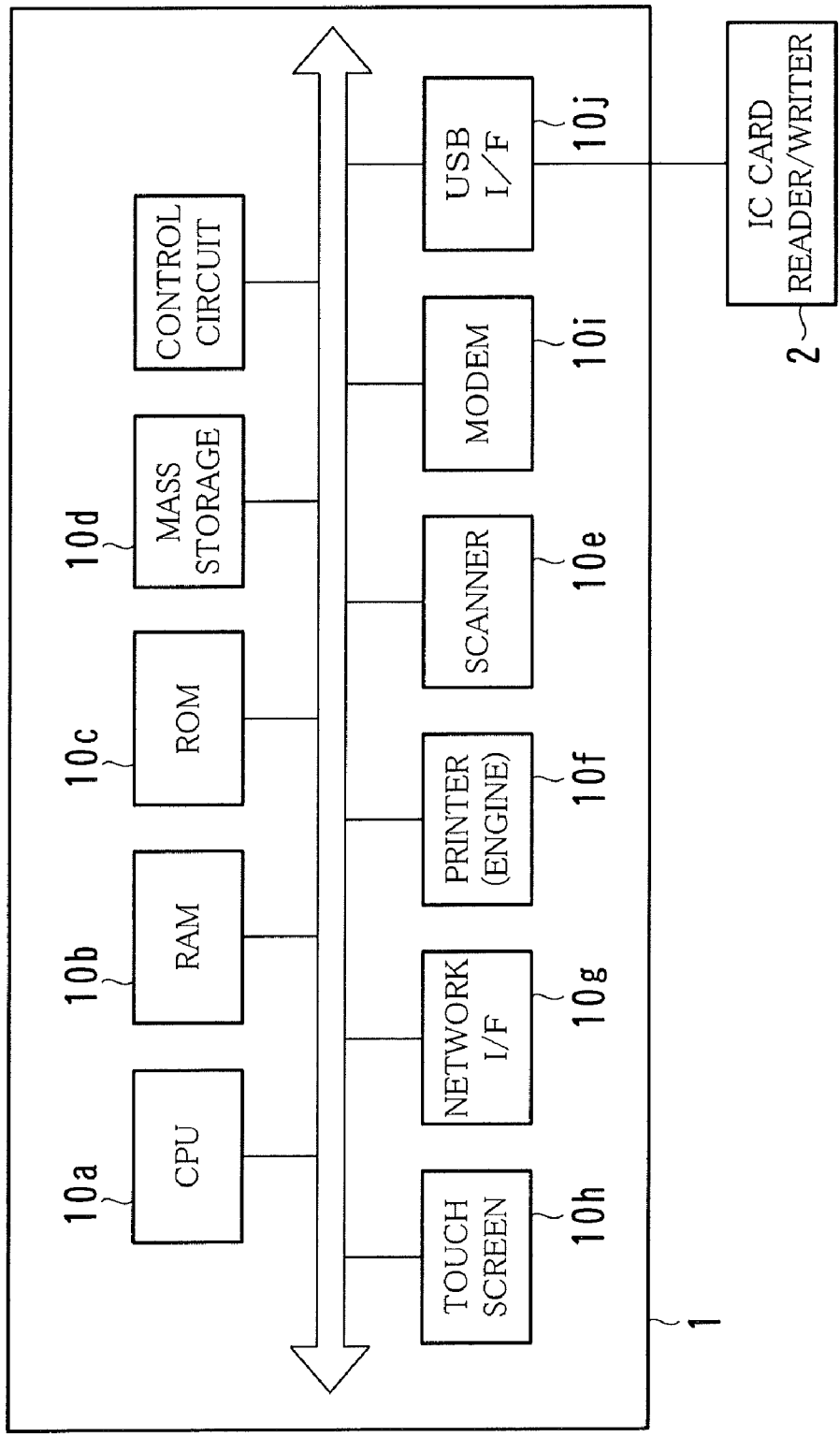
FIG. 2 is a diagram illustrating an example of the hardware configuration of an image forming apparatus.
Figure 3:
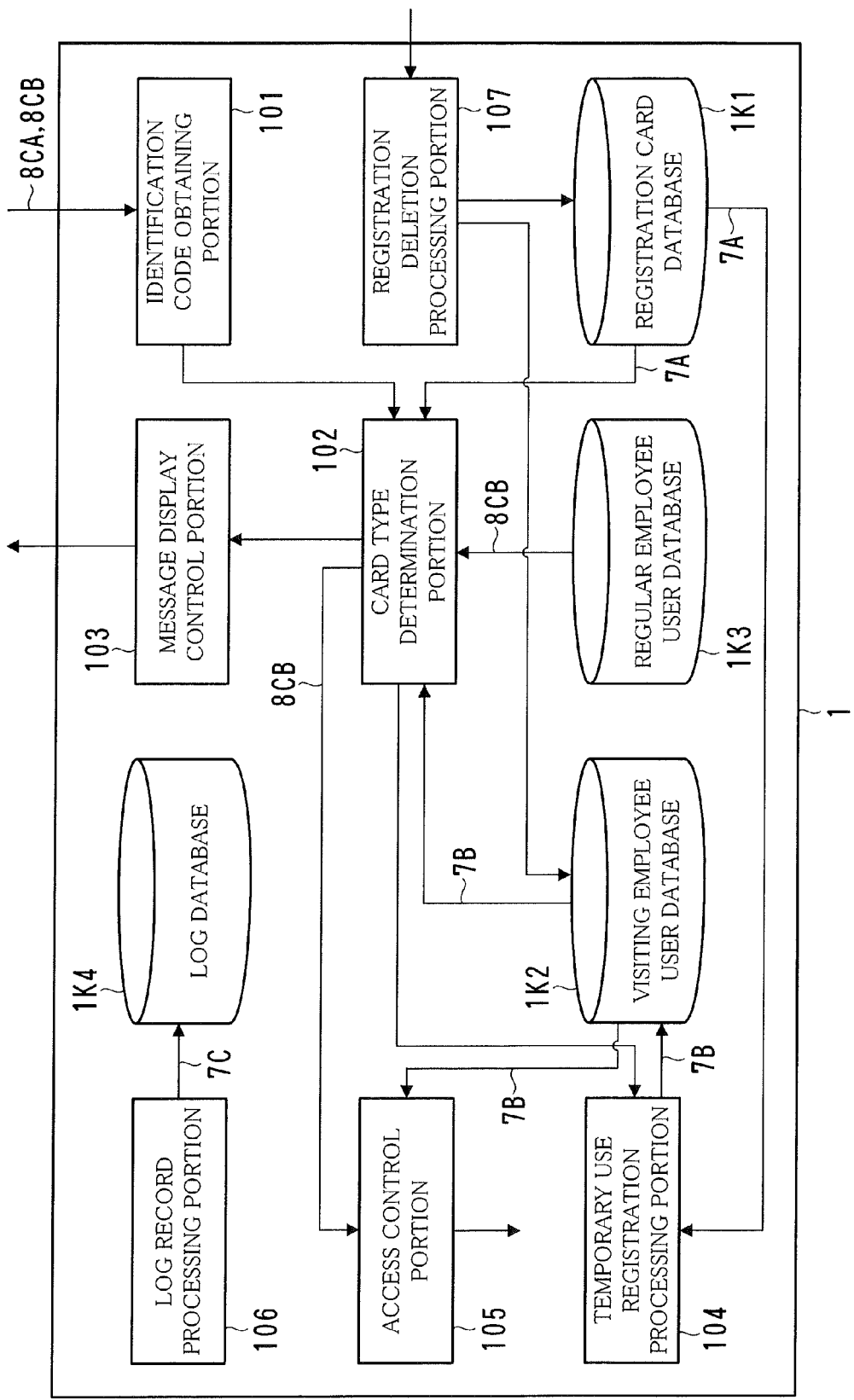
FIG. 3 is a diagram illustrating an example of the functional configuration of an image forming apparatus.

FIG. 1 is a diagram illustrating an example of a network system including an image forming apparatus 1; FIG. 2 is a diagram illustrating an example of the hardware configuration of the image forming apparatus 1; and FIG. 3 is a diagram illustrating an example of the functional configuration of the image forming apparatus 1.

Referring to FIG. 1, the image forming apparatus 1 is configured to connect to a device such as a personal computer 3 via a communication line, e.g., a Local Area Network (LAN), a public line, or the Internet.

The image forming apparatus 1 is an apparatus generally called a multifunction device, a Multi-Function Peripheral (MFP), or the like. The image forming apparatus 1 is configured to integrate, thereinto, a variety of functions, such as copying, faxing, network printing, scanning, and box function.

The network printing function is a function to receive image data from the personal computer 3 and print an image onto paper. The network printing function is sometimes called a "network printer function", a "PC printing function", or the like.

The box function is a function in which storage areas called "boxes" or "personal boxes" are allocated on a user-by-user basis, and document data such as an image file and the like is saved to a user's own storage area and managed therein. In short, the box function is equivalent to a file server function. The boxes herein correspond to "folders" or "directories" in a personal computer.

A user uses the image forming apparatus 1 to perform various operations of copying an image on paper to another paper, obtaining electronic data of an image on paper, transferring such electronic data to another device, and the like.

A description of the image forming apparatus 1 is given below by taking an example in which the image forming apparatus 1 is used under the following conditions.

(1) The image forming apparatus 1 is installed in a Y-branch of an X-company.

(2) An Integrated Circuit (IC) card used as an employee ID card is given to each employee of the X-company. Hereinafter, the IC card is referred to as a "personal card 5B". The personal card 5B stores, thereon, a personal card identification code 8CB for identifying the personal card 5B itself.

(3) Employees of the Y-branch are authorized to regularly use the image forming apparatus 1.

(4) Employees of bases other than the Y-branch are not authorized to regularly use the image forming apparatus 1. A supervisory manager of the Y-branch, however, can authorize a person who has visited the Y-branch on a business trip to temporarily use the image forming apparatus 1.

(5) The supervisory manager is given a personal card 5B, and further, one or more IC cards used only when he/she authorizes a visiting employee who has visited the Y-branch to use the image forming apparatus 1. Hereinafter, such an IC card is referred to as a "registration card 5A". The registration card 5A stores, thereon, a registration card identification code 8CA for identifying the registration card 5A itself.

Referring to FIG. 2, the image forming apparatus 1 is configured of a Central Processing Unit (CPU) 10a, a Random Access Memory (RAM) 10b, a Read-Only Memory (ROM) 10c, a mass storage 10d, a scanner 10e, a printer 10f, a network interface 10g, a touch screen 10h, a modem 10i, a Universal Serial Bus (USB) interface 10j, a control circuit, and so on.

The scanner 10e is a device that reads images printed on paper, such as photographs, characters, drawings, diagrams, and the like, and creates image data thereof.

The printer 10f serves to print, onto paper, an image obtained by scanning with the scanner 10e or an image included in image data received from another device.

The touch screen 10h displays, for example, a screen for giving a message or instructions to a user, a screen for the user to enter a process command and process conditions, and a screen displaying the result of a process performed by the CPU 10a. The touch screen 10h also detects a position thereof touched by the user with his/her finger and sends a signal indicating the result of the detection to the CPU 10a.

The network interface 10g is a Network Interface Card (NIC) for communicating with another device such as the personal computer 3 according to Transmission Control Protocol/Internet Protocol (TCP/IP) via the communication line.

The modem 10i is a device for transmitting image data via a fixed-line telephone network to another facsimile terminal and vice versa based on a protocol such as Group 3 (G3).

The USB interface 10j is an interface for connecting USB-compatible peripheral equipment to the image forming apparatus 1. The USB interface 10j is coupled to an IC card reader/writer 2 for reading out data from an IC card or writing data onto an IC card.

Referring to FIG. 3, the ROM 10c or the mass storage 10d stores programs for implementing functions of an identification code obtaining portion 101, a card type determination portion 102, a message display control portion 103, a temporary use registration processing portion 104, an access control portion 105, a log record processing portion 106, a registration deletion processing portion 107, a registration card database 1K1, a visiting employee user database 1K2, a regular employee user database 1K3, a log database 1K4, and the like. An example of the mass storage 10d is a hard disk or a flash memory. These programs are loaded into the RAM 10b as necessary, whereupon the programs are executed by the CPU 10a.

The whole or a part of the functions of the individual portions illustrated in FIG. 3 may be implemented merely by hardware such as a circuit.

The functions of the individual portions illustrated in FIG. 3 enable an employee who belongs to a base other than the Y-branch to temporarily use the image forming apparatus 1. The following is a description of, for example, the details of processes performed by the individual portions of the image forming apparatus 1 illustrated in FIG. 3. Note that a description of processes for a case where an employee of the Y-branch uses the image forming apparatus 1 is omitted.

Figure 6:
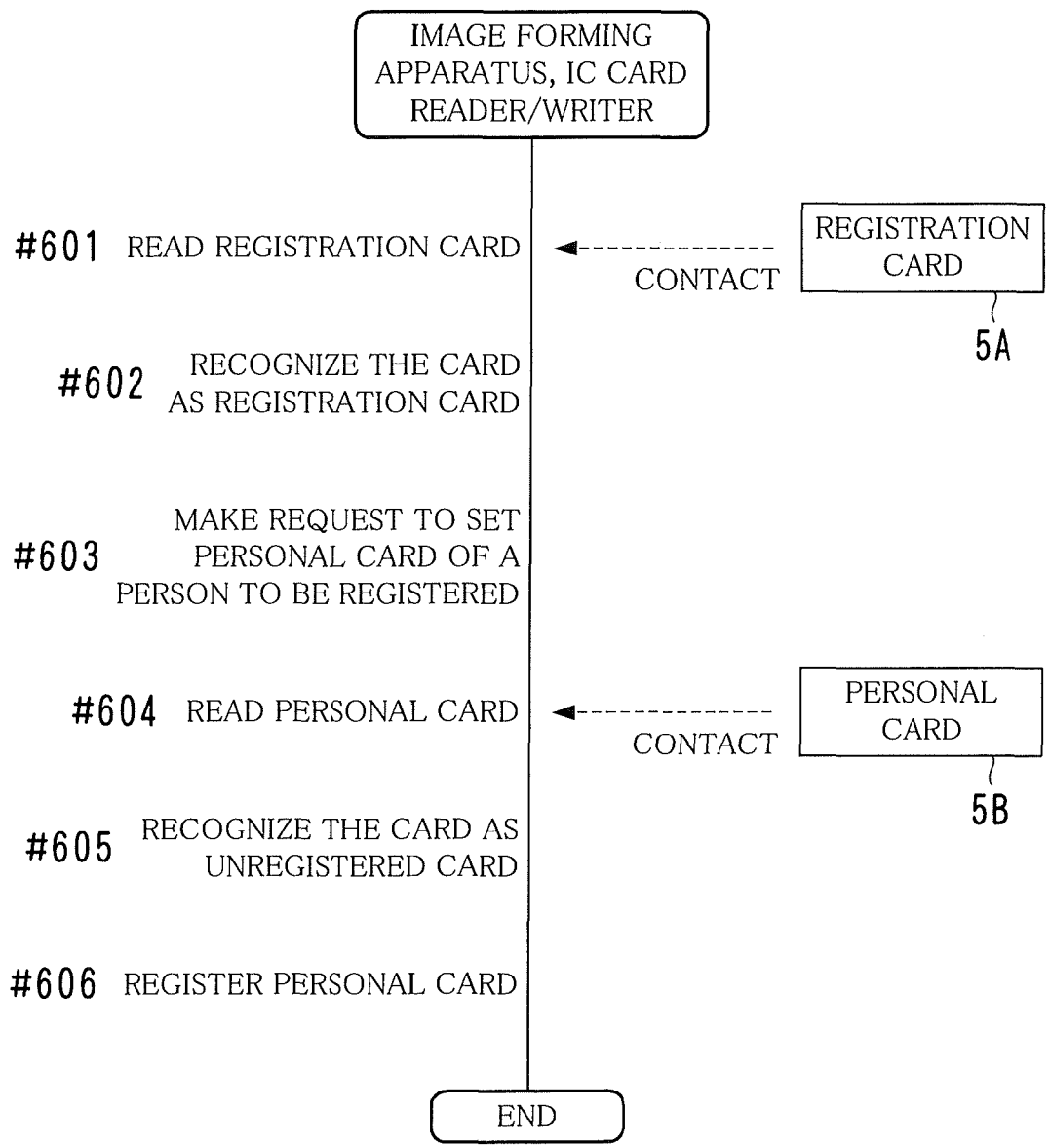
FIG. 6 is a flowchart illustrating an example of process steps and operation for registering a visiting employee as a user.
Figure 7:
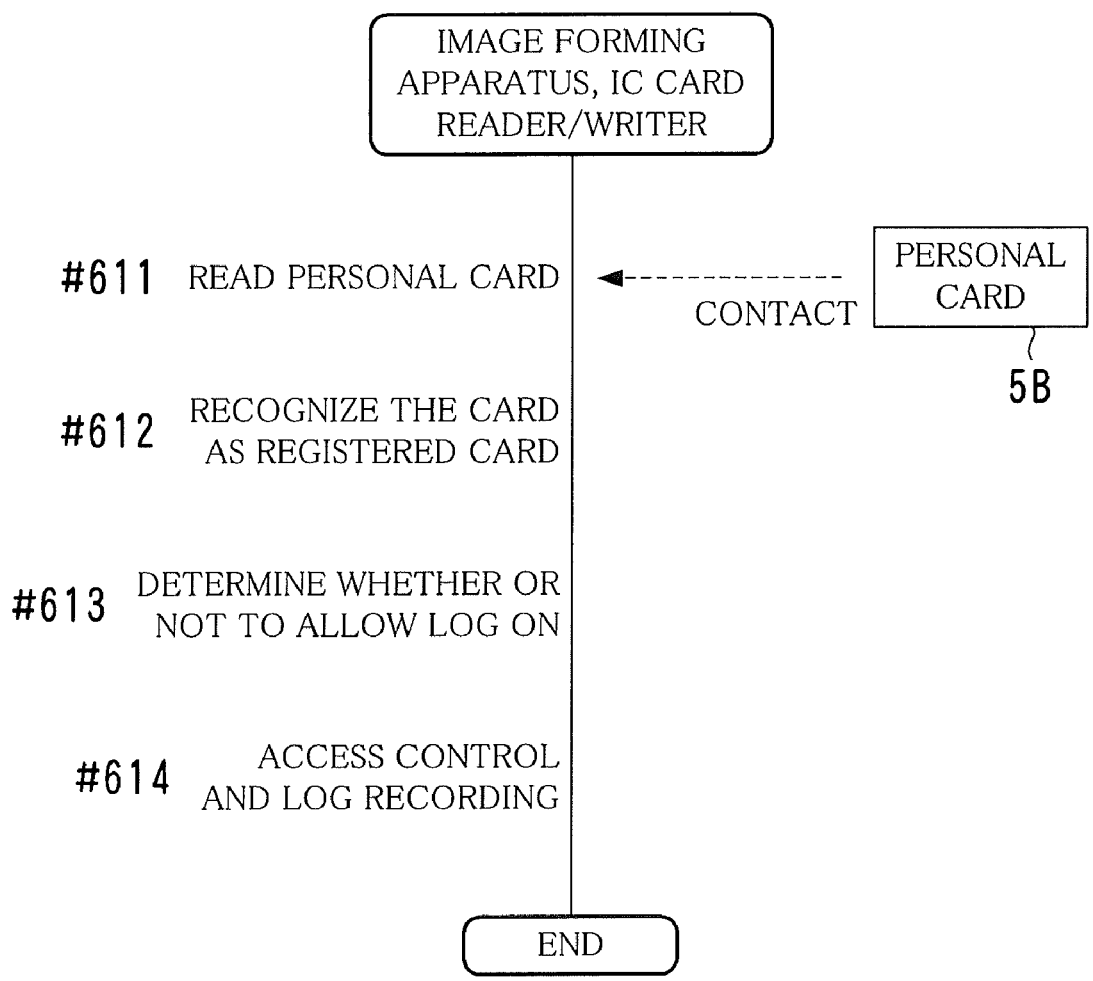
FIG. 7 is a flowchart illustrating an example of process steps and operation for user authentication of a visiting employee.

FIG. 4 is a diagram illustrating an example of the registration card database 1K1; FIG. 5 is a diagram illustrating an example of the visiting employee user database 1K2; FIG. 6 is a flowchart illustrating an example of process steps and operation for registering a visiting employee as a user; and FIG. 7 is a flowchart illustrating an example of process steps and operation for user authentication of a visiting employee.

The registration card database 1K1 illustrated in FIG. 3 stores, therein, registration card data 7A for each registration card 5A (see FIG. 4).

The registration card data 7A indicates a registration card identification code 8CA corresponding to the registration card 5A, and information on an access right that is to be given to a visiting employee in the case where the visiting employee is allowed to use the image forming apparatus 1 based on the registration card 5A. To be specific, the registration card data 7A indicates the following information concerning an access right.

The field named "PERIOD OF VALIDITY" of the registration card data 7A indicates how long the visiting employee is allowed to use the image forming apparatus 1. For example, if the value of "8 hours" is indicated in the field, then the visiting employee may use the image forming apparatus 1 for eight hours after permission to use the same has been given to him/her.

The field named "NUMBER OF TIMES USED" of the registration card data 7A indicates how many times the visiting employee is allowed to use the image forming apparatus 1. For example, if the value of "10 times" is indicated in the field, then the visiting employee may use the image forming apparatus 1 ten times after permission to use the same has been given to him/her.

The field named "REGISTERED RIGHT TRANSFER APPROVAL/DISAPPROVAL" indicates whether or not the visiting employee may transfer a right to use the image forming apparatus 1, which has been given to the visiting employee, to another visiting employee. If "Yes" is indicated in the field, then such transfer is permitted. Conversely, if "No" is indicated therein, then such transfer is not permitted.

The field named "COLOR PRINTING" indicates whether or not the visiting employee is allowed to use a color printing function. If "Yes" is indicated in the field, then he/she is allowed to use the color printing function. Conversely, if "No" is indicated therein, then he/she is not allowed to use the color printing function.

The field named "FAX TRANSMISSION" indicates whether or not the visiting employee is allowed to fax image data to another device. If "Yes" is indicated in the field, then he/she is allowed to fax image data to another device. Conversely, if "No" is indicated therein, then he/she is not allowed to fax image data to another device.

The field named "BOX" indicates whether or not the visiting employee is allowed to use a box function. If "Yes" is indicated in the field, then he/she is allowed to use the box function. Conversely, if "No" is indicated therein, then he/she is not allowed to use the box function.

Every time when a registration card 5A is newly issued, a system administrator operates the image forming apparatus 1, and the like, to generate registration card data 7A and add the registration card data 7A to the registration card database 1K1.

Referring back to FIG. 3, the visiting employee user database 1K2 stores, therein, visiting employee user data 7B per personal card 5B of visiting employees allowed to use the image forming apparatus 1 (see FIG. 5).

The visiting employee user data 7B indicates a personal card identification code 8CB corresponding to the personal card 5B, and a range within which the visiting employee is allowed to use the image forming apparatus 1 at present, i.e., a range of the access right to the image forming apparatus 1.

The field named "EXPIRATION DATE AND TIME" of the visiting employee user data 7B indicates the end of a period during which the visiting employee is allowed to use the image forming apparatus 1. The field named "NUMBER OF USES LEFT" indicates how many more times the visiting employee is allowed to use the image forming apparatus 1. The fields named "REGISTERED RIGHT TRANSFER APPROVAL/DISAPPROVAL", "COLOR PRINTING", "FAX TRANSMISSION", and "BOX" have the same meaning as those of the registration card data 7A described earlier with reference to FIG. 4.

The visiting employee user data 7B also includes a registration card identification code 8CA corresponding to a registration card 5A that has been used for generating the visiting employee user data 7B.

A process for storing the visiting employee user data 7B in the visiting employee user database 1K2, a process for updating the visiting employee user data 7B, and a process for deleting the visiting employee user data 7B from the visiting employee user database 1K2 are described in order below.

Referring back to FIG. 3, the regular employee user database 1K3 stores, therein, personal card identification codes 8CB corresponding to personal cards 5B of all the employees of the Y-branch. Every time when an employee is newly assigned to the Y-branch, in accordance with an operation performed by a system administrator, a personal card identification code 8CB of the employee is stored in the regular employee user database 1K3. Further, a personal card identification code 8CB of an employee who has been transferred from the Y-branch to a different base, or of an employee who has left the Y-branch is deleted from the regular employee user database 1K3 in accordance with an operation performed by a system administrator.

The identification code obtaining portion 101 obtains, from the IC card reader/writer 2, a registration card identification code 8CA that has been read out from a registration card 5A by the IC card reader/writer 2, and a personal card identification code 8CB that has been read out from a personal card 5B thereby. Hereinafter, the registration card identification code 8CA and the personal card identification code 8CB may be collectively referred to as an "identification code".

The card type determination portion 102 determines the type of an IC card on which the identification code obtained by the identification code obtaining portion 101 is stored, i.e., an IC card from which the identification code has been read out, or in other words, an IC card as the read source, in the following manner.

If the identification code obtained is indicated in any one of a plurality of pieces of the registration card data 7A stored in the registration card database 1K1, then the card type determination portion 102 determines that the type of the IC card as the read source is a registration card.

Alternatively, if the identification code obtained matches any one of the personal card identification codes 8CB stored in the regular employee user database 1K3, then the card type determination portion 102 determines that the type of the IC card as the read source is a personal card of an employee of the Y-branch.

Yet alternatively, if none of the above cases are true, then the card type determination portion 102 determines that the type of the IC card as the read source is a personal card of a visiting employee. The card type determination portion 102 may further determine whether a personal card 5B is registered or unregistered based on the visiting employee user database 1K2.

The message display control portion 103 causes the touch screen 10h to display a message indicating an operation to be performed next by the user.

The temporary use registration processing portion 104 performs a process for generating visiting employee user data 7B and registering the same in the visiting employee user database 1K2 in the case where the identification code obtaining portion 101 obtains a registration card identification code 8CA from a registration card 5A, and subsequently thereto or concurrently therewith, obtains a personal card identification code 8CB from a personal card 5B of a visiting employee. The following is a description of a series of processes and the flow of an operation with referenced to FIG. 6, taking an example in which visiting employee user data 7B of a user Ux who is a visiting employee is registered.

The user Ux arrives at the Y-branch, which is a business trip destination of the user Ux, and asks a supervisory manager of the Y-branch for permission to use the image forming apparatus 1. In response to this, the supervisory manager determines the details of a right (access right) to be given to the user Ux while considering how long the user Ux will be in the Y-branch, what kind of work the user Ux will do, and so on. As a result, the supervisory manager lends to the user UX a registration card 5A corresponding to the details of the access right thus determined.

The user Ux goes to a place where the image forming apparatus 1 is installed and brings the registration card 5A borrowed from the supervisory manager into contact with a predetermined position of the IC card reader/writer 2. Then, the IC card reader/writer 2 reads out a registration card identification code 8CA stored on the registration card 5A.

The identification code obtaining portion 101 obtains the registration card identification code 8CA thus read out (#601 of FIG. 6). The card type determination portion 102 determines that the type of the IC card from which the registration card identification code 8CA has been read out is a registration card (#602).

The message display control portion 103 causes the touch screen 10h to display a message requesting that a personal card 5B of a user who desires permission to temporarily use the image forming apparatus 1 be brought into contact with a predetermined position of the IC card reader/writer 2 (#603).

Responding to this, the user Ux brings his/her personal card 5B into contact with the predetermined position of the IC card reader/writer 2. Then, the IC card reader/writer 2 reads out a personal card identification code 8CB stored on the personal card 5B. The identification code obtaining portion 101 obtains the personal card identification code 8CB thus read out (#604).

The card type determination portion 102 determines that the type of the IC card from which the personal card identification code 8CB has been read out is a personal card of a visiting employee, and confirms that visiting employee user data 7B corresponding to the personal card identification code 8CB has not yet been registered (#605).

The temporary use registration processing portion 104 generates visiting employee user data 7B of the user Ux and stores the same in the visiting employee user database 1K2 (see FIG. 5) (#606). The temporary use registration processing portion 104 generates the visiting employee user data 7B in such a manner that the individual fields thereof indicate the following details.

The field named "PERSONAL CARD IDENTIFICATION CODE" indicates the personal card identification code 8CB obtained in Step #604.

The values in the "EXPIRATION DATE AND TIME" through "BOX" fields are specified based on the registration card data 7A including the registration card identification code 8CA obtained in Step #601.

The field "EXPIRATION DATE AND TIME" indicates a date and time obtained by adding a value indicated in the "PERIOD OF VALIDITY" filed of the registration card data 7A to the current date and time, i.e., a date and time at which the visiting employee user data 7B has been generated.

The values of the "NUMBER OF USES LEFT", "REGISTERED RIGHT TRANSFER APPROVAL/DISAPPROVAL", "COLOR PRINTING", "FAX TRANSMISSION", and "BOX" fields are indicated by respectively copying the values of the "NUMBER OF TIMES USED", "REGISTERED RIGHT TRANSFER APPROVAL/DISAPPROVAL", "COLOR PRINTING", "FAX TRANSMISSION", and "BOX" fields of the registration card data 7A.

Referring back to FIG. 3, the access control portion 105 performs a control process for a case in which a visiting employee uses the image forming apparatus 1. The log record processing portion 106 generates log data 7C indicating a record that a visiting employee uses the image forming apparatus 1, and stores the log data 7C thus generated in the log database 1K4.

The following is a description of the processes performed by the access control portion 105 and the log record processing portion 106 with referenced to FIG. 7, taking an example in which the user Ux uses the image forming apparatus 1.

After receiving permission to use the image forming apparatus 1, the user Ux brings his/her personal card 5B into contact with a predetermined position of the IC card reader/writer 2. Then, the IC card reader/writer 2 reads out a personal card identification code 8CB stored on the personal card 5B.

The identification code obtaining portion 101 obtains the personal card identification code 8CB thus read out (#611 of FIG. 7). The card type determination portion 102 determines that the type of the IC card from which the personal card identification code 8CB has been read out is a personal card of a visiting employee (#612).

Responding to this, the access control portion 105 calls, from the visiting employee user database 1K2 (see FIG. 5), visiting employee user data 7B including the obtained personal card identification code 8CB, performs a process for determining whether or not logging onto the image forming apparatus 1 is allowed, and performs a process for access control based on the visiting employee user data 7B.

To be specific, if the "NUMBER OF USES LEFT" field of the visiting employee user data 7B indicates "1" or more, then the access control portion 105 allows the user Ux to log onto the image forming apparatus 1. Instead, however, if the "NUMBER OF USES LEFT" field indicates "zero", then the access control portion 105 does not allow the user Ux to log onto the image forming apparatus 1 (#613).

After the user Ux has logged onto the image forming apparatus 1, the access control portion 105 sets a limit on the execution of various processes (jobs) in accordance with the details indicated in the fields relating to the access right included in the visiting employee user data 7B of the user Ux. Upon the execution of a job, the log record processing portion 106 generates log data 7C indicating, for example, the details of the job and the personal card identification code 8CB of the user Ux, and stores the log data 7C thus generated in the log database 1K4 (#614).

Note that a value indicated in the "NUMBER OF USES LEFT" field of the visiting employee user data 7B is reduced by "one" every time when the user Ux causes the image forming apparatus 1 to execute a job once.

Referring back to FIG. 3, the registration deletion processing portion 107 performs a process for deleting registered permission to use the image forming apparatus 1 that has been given to a visiting employee. Specifically, visiting employee user data 7B of a visiting employee is deleted from the visiting employee user database 1K2. The registration deletion processing portion 107 deletes the visiting employee user data 7B from the visiting employee user database 1K2 at the following timing.

The registration deletion processing portion 107 searches, at regular intervals, e.g., every ten minutes, in the visiting employee user database 1K2 for visiting employee user data 7B in which a date and time indicated in the field "EXPIRATION DATE AND TIME" is beyond the current date and time. If such visiting employee user data 7B is found by the search, then the registration deletion processing portion 107 deletes the visiting employee user data 7B thus found from the visiting employee user database 1K2.

Alternatively, if a system administrator or a supervisory manager of the Y-branch specifies a registration card identification code 8CA and enters a command to invalidate a registration card 5A into the image forming apparatus 1, then the registration deletion processing portion 107 searches in the visiting employee user database 1K2 for visiting employee user data 7B including the registration card identification code 8CA thus specified, and deletes the visiting employee user data 7B found by the search from the visiting employee user database 1K2. At this time, the registration deletion processing portion 107 also deletes, from the registration card database 1K1, registration card data 7A including the registration card identification code 8CA thus specified.

Figure 8:
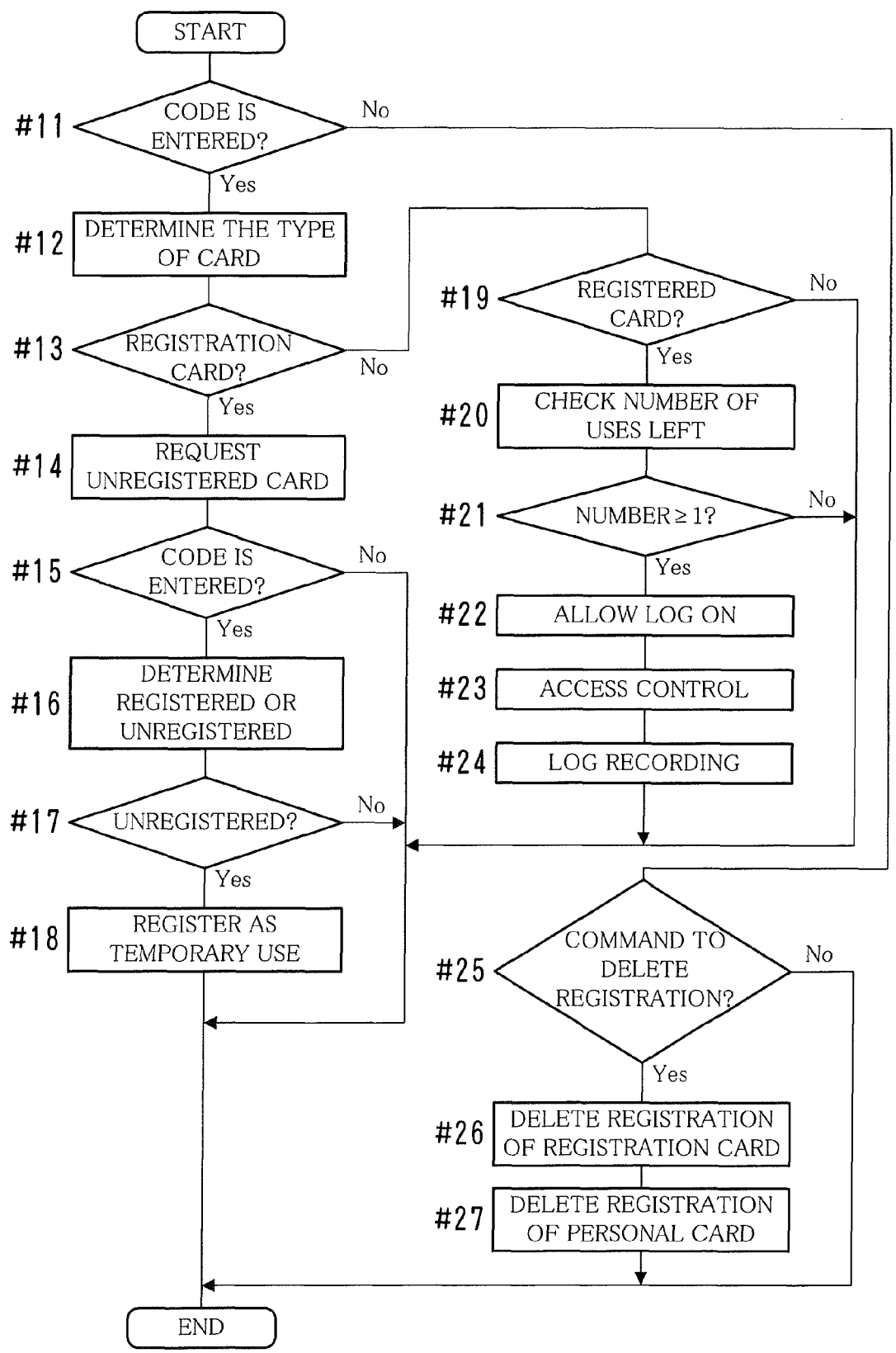
FIG. 8 is a flowchart illustrating an example of the overall processing flow of an image forming apparatus for a visiting employee.

FIG. 8 is a flowchart illustrating an example of the overall processing flow of the image forming apparatus 1 for a visiting employee.

The following is a description of the overall processing flow of the image forming apparatus 1 with reference to the flowchart in FIG. 8.

Upon the entry of an identification code or a command, the image forming apparatus 1 performs the following process.

When an identification code that has been read out from an IC card by the IC card reader/writer 2 is entered into the image forming apparatus 1 (Yes in #11 of FIG. 8), the image forming apparatus 1 determines a type of the IC card (#12).

If the IC card is determined to be a registration card (Yes in #13), then the image forming apparatus 1 displays a message requesting that a personal card 5B of a user who desires permission to temporarily use the image forming apparatus 1B be brought into contact with a predetermined position of the IC card reader/writer (#14).

The image forming apparatus 1 waits for a predetermined amount of time, e.g., thirty seconds, to elapse after the message has been displayed. When an identification code is entered by the IC card reader/writer 2 before the predetermined amount of time has elapsed (Yes in #15), if the identification code is a personal card identification code 8CB corresponding to a personal card 5B of a visiting employee, i.e., the identification code is not stored in the regular employee user database 1K3 and, at the same time, if the identification code (personal card identification code 8CB) is not included in any of the plurality of pieces of the visiting employee user data 7B (see FIG. 5) (Yes in #17), then the image forming apparatus 1 registers new visiting employee user data 7B (#18).

If no identification code is entered by the IC card reader/writer 2 before the predetermined amount of time has elapsed, or, alternatively, if visiting employee user data 7B including the identification code (personal card identification code 8CB) has already been registered (No in #15 or No in #17), then the process for registration discontinues.

If the image forming apparatus 1 determines, in Step #12, that a type of the IC card from which the identification code has been read out is a personal card of a visiting employee (No in #13), then the image forming apparatus 1 performs a process for managing the use thereof in the following manner. If the visiting employee user database 1K2 stores, therein, visiting employee user data 7B including the identification code (personal card identification code 8CB) entered by the IC card reader/writer 2 (Yes in #19), then the image forming apparatus 1 checks a value in the "NUMBER OF USES LEFT" field of the visiting employee user data 7B (#20).

If the value in the "NUMBER OF USES LEFT" field is "1" or more (Yes in #21), then the image forming apparatus 1 allows the user to log thereonto (#22). While the user longs onto the image forming apparatus 1, the image forming apparatus 1 executes a process (job) within the access right indicated in the visiting employee user data 7B in accordance with a command issued by the user (#23). Then, every time when executing a job, the image forming apparatus 1 generates log data 7C including the record and a personal card identification code 8CB of the user, and stores the log data 7C in the log database 1K4 (#24). Further, every time when executing a job, the image forming apparatus 1 reduces a value in the "NUMBER OF USES LEFT" field by "one".

Further, when a registration card identification code 8CA is specified and a command to invalidate a registration card 5A is entered into the image forming apparatus 1 (Yes in #25), the image forming apparatus 1 deletes visiting employee user data 7B and registration card data 7A both of which include the registration card identification code 8CA (#26 and #27).

Moreover, the image forming apparatus 1 deletes expired visiting employee user data 7B appropriately.

Figure 9:
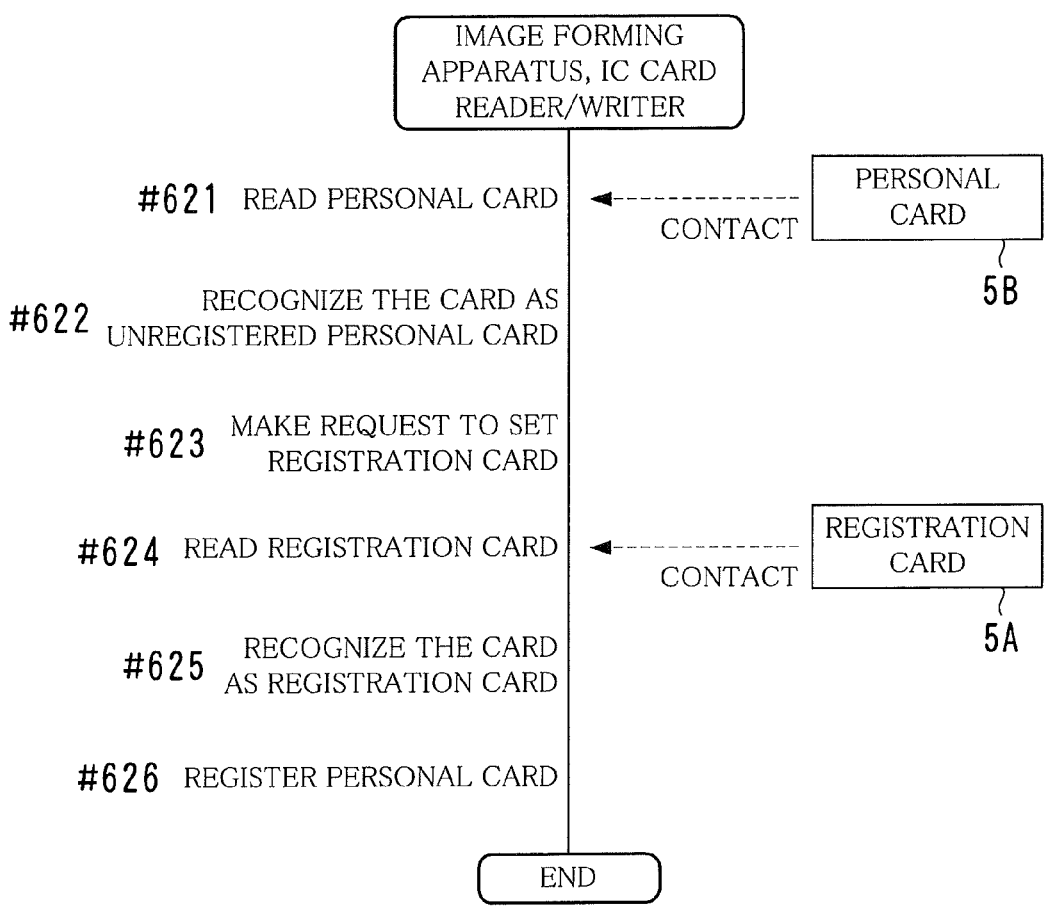
FIG. 9 is a flowchart illustrating an example of process steps and operation for registering a visiting employee as a user.
Figure 10:
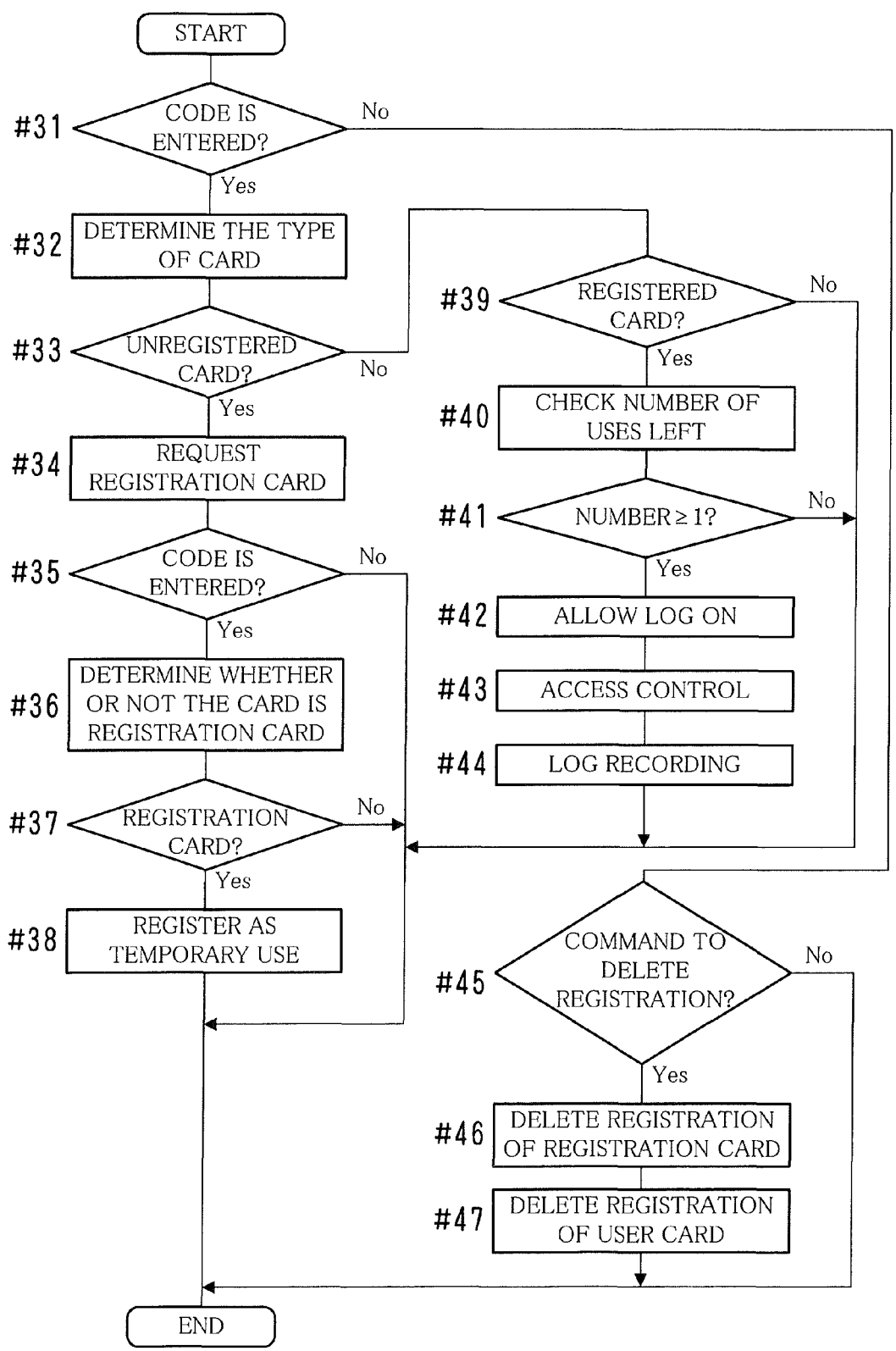
FIG. 10 is a flowchart illustrating an example of the overall processing flow of an image forming apparatus for a visiting employee.

FIG. 9 is a flowchart illustrating an example of process steps and operation for registering a visiting employee as a user, and FIG. 10 is a flowchart illustrating an example of the overall processing flow of the image forming apparatus 1 for a visiting employee.

In the first embodiment, a visiting employee brings a registration card 5A and his/her personal card 5B into contact with the IC card reader/writer 2 in the stated order for registration of his/her visiting employee user data 7B. Instead, another configuration is possible in which, first, a personal card 5B is brought into contact with the IC card reader/writer 2 and, after that, a registration card 5A is brought into contact therewith. If this is the case, the individual portions of the image forming apparatus 1 illustrated in FIG. 3 perform the user registration process according to the procedure illustrated in FIG. 9.

For example, the user Ux borrows a registration card 5A and goes to a place where the image forming apparatus 1 is installed. The user Ux brings his/her personal card 5B into contact with a predetermined position of the IC card reader/writer 2. Then, the IC card reader/writer 2 reads out a personal card identification code 8CB from the personal card 5B. The identification code obtaining portion 101 of the image forming apparatus 1 obtains the personal card identification code 8CB thus read out (#621 of FIG. 9).

The card type determination portion 102 determines that the type of the IC card from which the personal card identification code 8CB has been read out is a personal card of a visiting employee and confirms that visiting employee user data 7B including the personal card identification code 8CB has not yet been registered (#622).

The message display control portion 103 causes the touch screen 10h to display a message requesting that a registration card 5A be brought into contact with a predetermined position of the IC card reader/writer 2 (#623).

Responding to this, the user Ux brings the borrowed registration card 5A into contact with the predetermined position of the IC card reader/writer 2. Then, the IC card reader/writer 2 reads out a registration card identification code 8CA stored on the registration card 5A. The identification code obtaining portion 101 obtains the registration card identification code 8CA thus read out (#624).

The card type determination portion 102 determines that the type of the IC card from which the registration card identification code 8CA has been read out is a personal card of a visiting employee (#625).

The temporary use registration processing portion 104 generates visiting employee user data 7B of the user Ux and stores the same in the visiting employee user database 1K2 (see FIG. 5) (#626). The details to be indicated in the visiting employee user data 7B are determined in the same manner as those described earlier.

The overall processing flow of the image forming apparatus 1 is shown in FIG. 10 for a case in which a personal card 5B and a registration card 5A are brought into contact with the IC card reader/writer 2 in the stated order.

To be specific, when an identification code that has been read out from an IC card by the IC card reader/writer 2 is entered into the image forming apparatus 1 (Yes in #31 of FIG. 10), the image forming apparatus 1 determines a type of the IC card (#32).

If the IC card is determined to be a personal card of a visiting employee that has not yet been registered (Yes in #33), then the image forming apparatus 1 displays a message requesting that a registration card 5A be brought into contact with a predetermined position of the IC card reader/writer 2 (#34).

The image forming apparatus 1 waits for a predetermined amount of time, e.g., thirty seconds, to elapse after the message has been displayed. When an identification code is entered by the IC card reader/writer 2 before the predetermined amount of time has elapsed (Yes in #35), the image forming apparatus 1 determines whether or not the identification code corresponds to any one of the registration cards 5A (#36). If the identification code corresponds to any one of the registration cards 5A (Yes in #37), then the image forming apparatus registers new visiting employee user data 7B (#38).

Processes other than the process for registering visiting employee user data 7B are the same as those specified in Step #19 to Step #27 of FIG. 8 (#39-#47).

Figure 11:
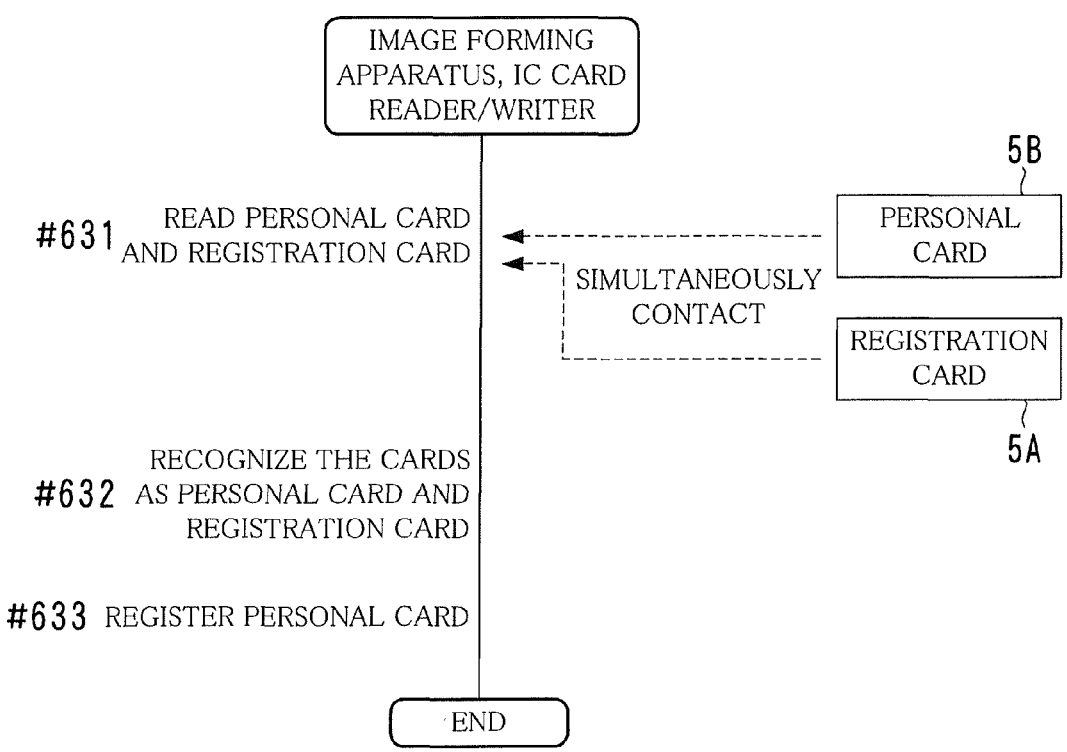
FIG. 11 is a flowchart illustrating an example of process steps and operation for registering a visiting employee as a user.
Figure 12:
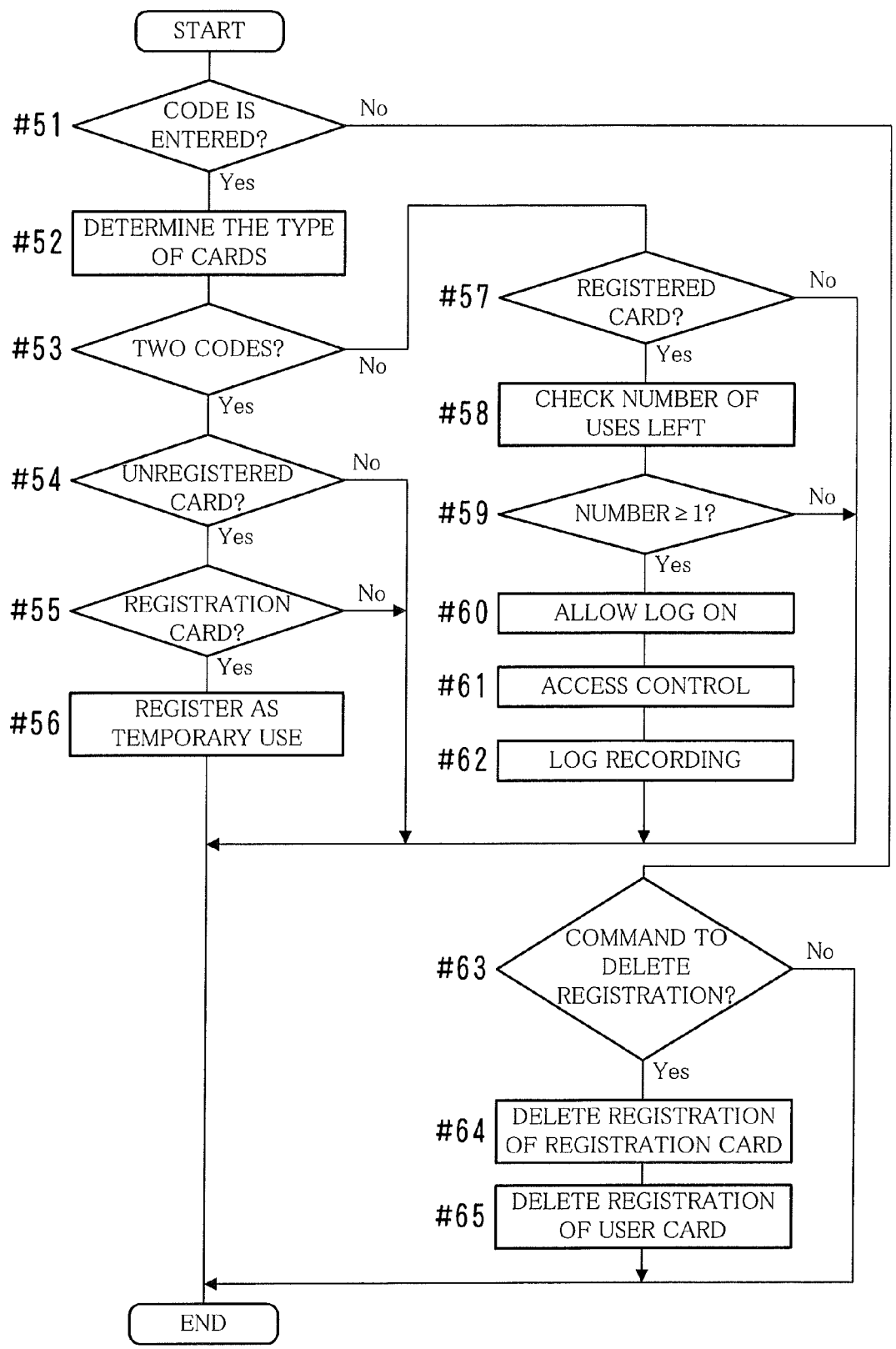
FIG. 12 is a flowchart illustrating an example of the overall processing flow of an image forming apparatus for a visiting employee.

FIG. 11 is a flowchart illustrating an example of process steps and operation for registering a visiting employee as a user, and FIG. 12 is a flowchart illustrating an example of the overall processing flow of the image forming apparatus 1 for a visiting employee.

Another configuration is possible in which a registration card 5A and a personal card 5B are arranged one above the other and are brought into contact with the IC card reader/writer 2 at the same time.

In such a case, the individual portions of the image forming apparatus 1 illustrated in FIG. 3 perform the user registration process according to the procedure illustrated in FIG. 11.

Suppose that, for example, the user Ux who has visited the Y-branch on a business trip borrows a registration card 5A. The user Ux brings his/her personal card 5B and the borrowed registration card 5A into contact with a predetermined position of the IC card reader/writer 2. Responding to this, the IC card reader/writer 2 reads out a personal card identification code 8CB and a registration card identification code 8CA respectively from the personal card 5B and the registration card 5A. The identification code obtaining portion 101 of the image forming apparatus 1 obtains the personal card identification code 8CB and the registration card identification code 8CA thus read out (#631 of FIG. 11).

The card type determination portion 102 determines that the individual types of the two IC cards from which those identification codes have been read out are a registration card and a personal card of a visiting employee, and confirms that visiting employee user data 7B of the user Ux has not yet been registered (#632).

The temporary use registration processing portion 104 generates visiting employee user data 7B of the user Ux and stores the same in the visiting employee user database 1K2 (see FIG. 5) (#633). The details to be indicated in the visiting employee user data 7B are determined in the same manner as those described earlier.

The overall processing flow of the image forming apparatus 1 is shown in FIG. 12 for a case in which a registration card 5A and a personal card 5B are simultaneously brought into contact with the IC card reader/writer 2.

To be specific, when one or two identification codes read out from one or two IC cards by the IC card reader/writer 2 are entered into the image forming apparatus 1 (Yes in #51 of FIG. 12), the image forming apparatus 1 determines individual types of the IC cards (#52).

The image forming apparatus 1 registers new visiting employee user data 7B (#56) if all of the following conditions are satisfied:

Two identification codes are entered (Yes in #53);

One of the IC cards is determined to be a personal card of a visiting employee, and visiting employee user data 7B for that IC card (personal card 5B) has not yet been registered (Yes in #54); and The other of the IC cards is determined to be a registration card (Yes in #55).

Processes other than the process for registering visiting employee user data 7B are the same as those specified in Step #19 to Step #27 of FIG. 8 (#57-#65).

[Second Embodiment]

Figure 13:
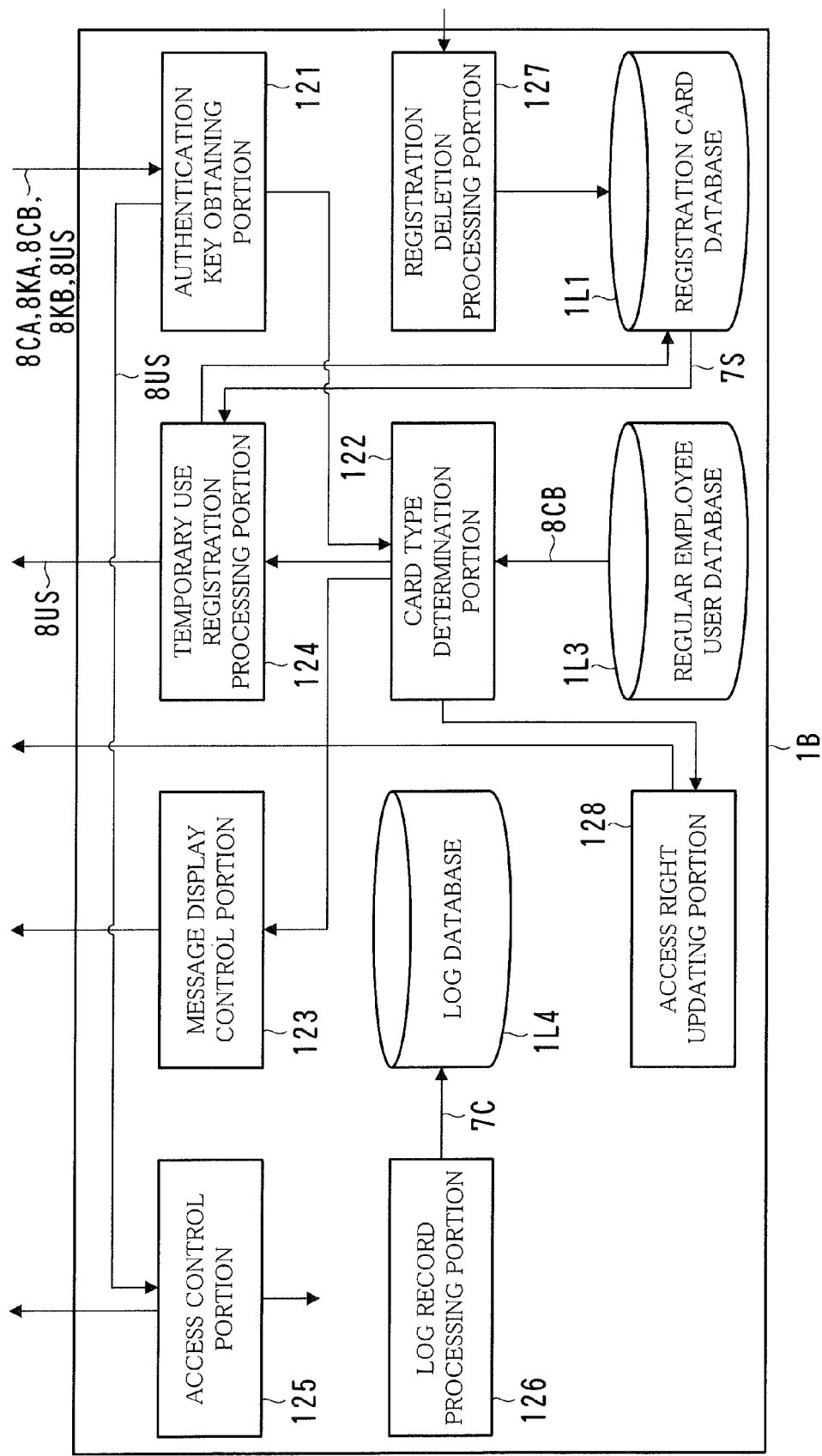
FIG. 13 is a diagram illustrating an example of the functional configuration of an image forming apparatus.
Figure 14:
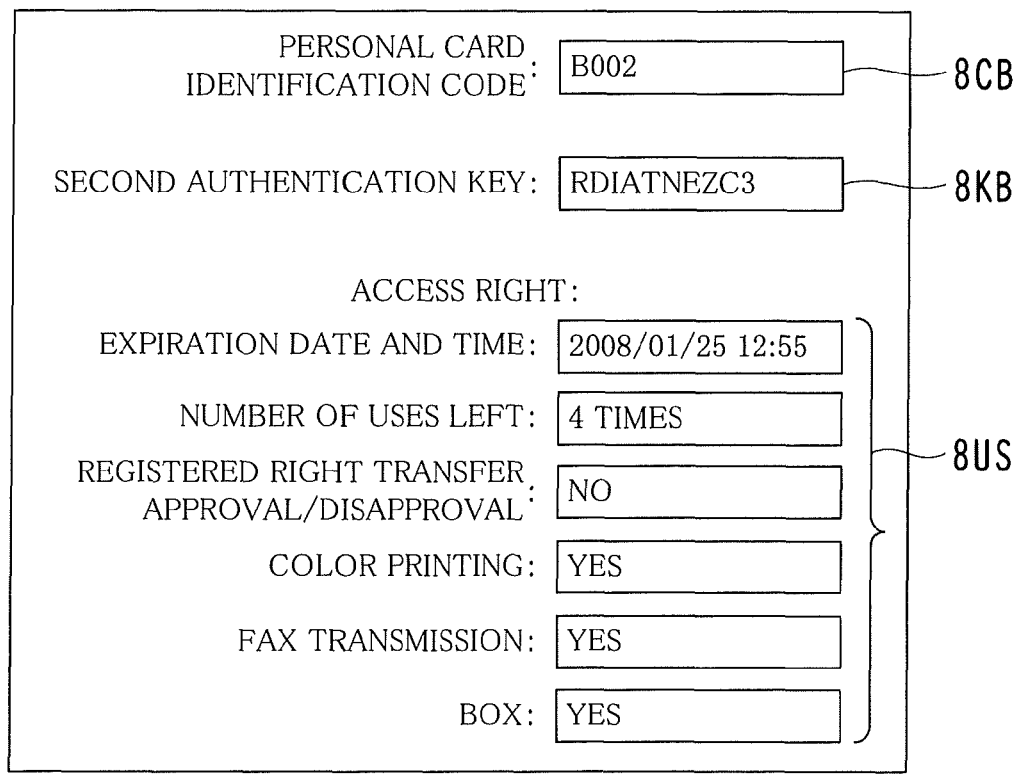
FIG. 14 is a diagram illustrating an example of data stored on a personal card.
Figure 16:
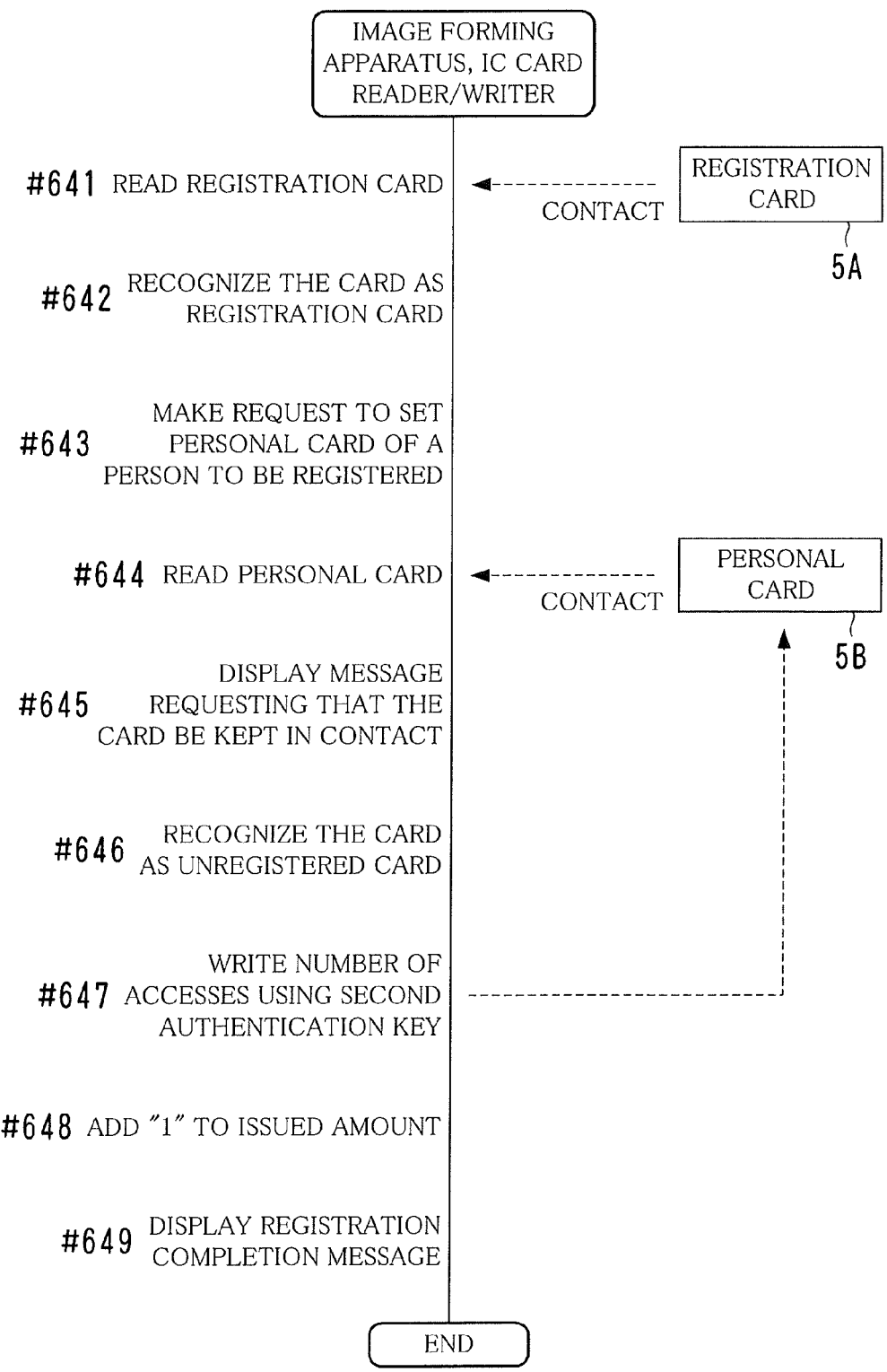
FIG. 16 is a flowchart illustrating an example of process steps and operation for registering a visiting employee as a user.
Figure 17:
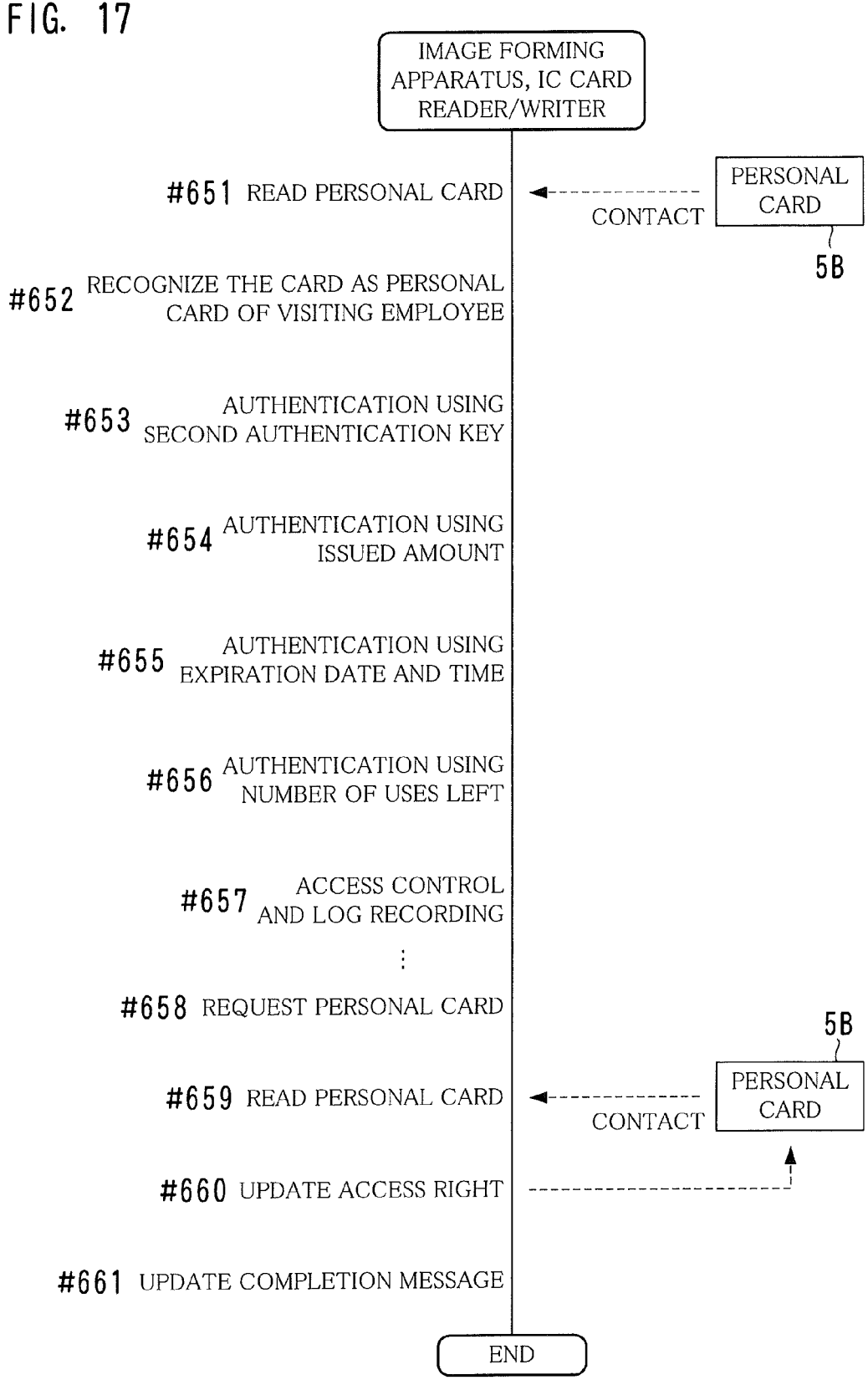
FIG. 17 is a flowchart illustrating an example of process steps and operation for user authentication of a visiting employee.

FIG. 13 is a diagram illustrating an example of the functional configuration of an image forming apparatus 1B; FIG. 14 is a diagram illustrating an example of data stored on a personal card 5B; FIG. 15 is a diagram illustrating an example of a registration card database 1L1; FIG. 16 is a flowchart illustrating an example of process steps and operation for registering a visiting employee as a user; and FIG. 17 is a flowchart illustrating an example of process steps and operation for user authentication of a visiting employee.

In the first embodiment, the visiting employee user database 1K2 (see FIG. 5) centrally manages a plurality of pieces of data (visiting employee user data 7B) relating to access rights of users who have been allowed to use the image forming apparatus 1. Unlike the first embodiment, in the second embodiment, visiting employee user data 7B is stored on a personal card 5B. Further, in the second embodiment, an authentication key is stored on each of a registration card 5A and a personal card 5B, and such authentication keys are used to perform user authentication.

The hardware configuration of the image forming apparatus 1B according to the second embodiment is similar to that of the image forming apparatus 1 illustrated in FIG. 2 according to the first embodiment. The ROM 10c and the mass storage 10d of the image forming apparatus 1B, however, store, instead of the programs for implementing the functions of the individual portions illustrated in FIG. 3, programs for implementing functions of an authentication key obtaining portion 121, a card type determination portion 122, a message display control portion 123, a temporary use registration processing portion 124, an access control portion 125, a log record processing portion 126, a registration deletion processing portion 127, an access right updating portion 128, a registration card database 1L1, a regular employee user database 1L3, a log database 1L4, and the like (see FIG. 13).

The whole or a part of the functions of the individual portions illustrated in FIG. 13 may be implemented merely by hardware such as a circuit.

The following is a description of the details of processes performed by the individual portions of the image forming apparatus 1B illustrated in FIG. 13, focusing on the differences between the first embodiment and the second embodiment. Descriptions of points that are identical with those in the first embodiment are omitted.

A registration card 5A stores, thereon, a registration card identification code 8CA and a first authentication key 8KA unique to the registration card 5A. The first authentication key 8KA is a character string having random characters arranged and having a fixed length La. Such a character string is sometimes used in an encryption key.

Referring to FIG. 14, the personal card 5B is configured to store, thereon, a personal card identification code 8CB unique to the personal card 5B and a second authentication key 8KB unique thereto. The second authentication key 8KB is a character string having random characters arranged and such a character string is sometimes used in an encryption key. The character string has a fixed length Lb that is longer than the fixed length La by a predetermined length Lc. The personal card 5B is configured to also store, thereon, access right data 8US that is equivalent to data relating to an access right included in the visiting employee user data 7B according to the first embodiment. As described later, the second authentication key 8KB and the access right data 8US are stored on a personal card 5B of a user who has been allowed to use the image forming apparatus 1B.

The IC card reader/writer 2 reads out a registration card identification code 8CA and a first authentication key 8KA from a registration card 5A that has come into contact therewith. Alternatively, the IC card reader/writer 2 reads out a personal card identification code 8CB from a personal card 5B that has come into contact therewith. In the case where a personal card 5B stores, thereon, a second authentication key 8KB and access right data 8US, the IC card reader/writer 2 also reads out the same. Hereinafter, the first authentication key 8KA and the second authentication key 8KB may be collectively referred to as an "authentication key".

Referring to FIG. 15, the registration card database 1L1 stores, therein, registration card data 7S for each registration card 5A.

The registration card data 7S indicates a registration card identification code 8CA corresponding to the registration card 5A, and a first authentication key 8KA. As with the registration card data 7A (see FIG. 4) of the first embodiment, the registration card data 7S also indicates information on an access right that is to be given to a visiting employee in the case where the visiting employee is allowed to use the image forming apparatus 1B based on the registration card 5A. Further, the registration card data 7S indicates the number of second authentication keys 8KB that have been issued based on the corresponding first authentication key 8KA, i.e., the issued amount of the second authentication keys 8KB. The initial value of the issued amount thereof is "zero". A method for issuing a second authentication key 8KB is described later.

As with the regular employee user database 1K3 (see FIG. 3) of the first embodiment, the regular employee user database 1L3 stores, therein, personal card identification codes 8CB corresponding to personal cards 53 of all the employees of the Y-branch.

The authentication key obtaining portion 121 obtains the first authentication key 8KA, the second authentication key 8KB, the personal card identification code 8CB, and the access right data 8US, all of which have been read out by the IC card reader/writer 2.

The card type determination portion 122 determines the type of an IC card on which the authentication keys and the like obtained by the authentication key obtaining portion 121 are stored, i.e., an IC card as the read source. A method for determining the type of such an IC card is the same as that used in the card type determination portion 102 of the first embodiment.

As with the message display control portion 103 of the first embodiment, the message display control portion 123 causes the touch screen 10h to display a message indicating an operation to be performed next by the user.

In the case where the authentication key obtaining portion 121 obtains a registration card identification code 8CA from a registration card 5A, and subsequently thereto or concurrently therewith, obtains a personal card identification code 8CB from a personal card 5B of a visiting employee that has not yet been registered, the temporary use registration processing portion 124 performs a process for allowing a holder of the personal card 5B to use the image forming apparatus 1B. To be specific, the temporary use registration processing portion 124 performs a process for writing a second authentication key 8KB and access right data 8US onto the personal card 5B. The following is a description of a series of processes and the flow of an operation with referenced to FIG. 16, taking an example in which permission for a user Ux to use the image forming apparatus 1B is registered.

The user Ux borrows a registration card 5A and goes to a place where the image forming apparatus 1B is installed. The user Ux brings the registration card 5A into contact with a predetermined position of the IC card reader/writer 2. Then, the IC card reader/writer 2 reads out a registration card identification code 8CA and a first authentication key 8KA stored on the registration card 5A (#641 of FIG. 16). The authentication key obtaining portion 121 of the image forming apparatus 1B obtains, from the IC card reader/writer 2, the first authentication key 8KA thus read out (#641 of FIG. 16).

The card type determination portion 122 determines that the type of the IC card from which the registration card identification code 8CA and the like have been read out is a registration card (#642).

The message display control portion 123 causes the touch screen 10h to display a message requesting that a personal card 5B of a user who desires permission to temporarily use the image forming apparatus 1B be brought into contact with a predetermined position of the IC card reader/writer 2 (#643).

Responding to this, the user Ux brings his/her personal card 5B into contact with the predetermined position of the IC card reader/writer 2. Then, the IC card reader/writer 2 reads out a personal card identification code 8CB stored on the personal card 5B. The authentication key obtaining portion 121 obtains the personal card identification code 8CB thus read out (#644).

The message display control portion 123 causes the touch screen 10h to display a message requesting that the IC card be kept in contact with the IC card reader/writer 2 until the completion of the registration process (#645).

The card type determination portion 122 determines that the type of the IC card from which the personal card identification code 8CB has been read out is a personal card of a visiting employee, and confirms that visiting employee user data 7B corresponding to the personal card identification code 8CB has not yet been registered (#646).

The temporary use registration processing portion 124 performs a process for allowing the user Ux to use the image forming apparatus 1B in the following manner.

The temporary use registration processing portion 124 generates (issues) a second authentication key 8KB by adding, to the end of the first authentication key 8KA obtained in Step #641, a character string representing a value obtained by adding "1" to the current value indicated in the "ISSUED AMOUNT" field of registration card data 7S including the first authentication key 8KA. The temporary use registration processing portion 124 further generates access right data 8US based on information concerning an access right included in the registration card data 7S. Then, the temporary use registration processing portion 124 controls the IC card reader/writer 2 in such a manner that the second authentication key 8KB and the access right data 8US thus generated are written onto the personal card 5B (#647).

After the writing process, the temporary use registration processing portion 124 adds "1" to the value indicated in the "ISSUED AMOUNT" field of the registration card data 7S (#648). The message display control portion 123 causes the touch screen 10h to display a message indicating that the registration process has been completed (#649). Once this message is displayed, the user Ux may release the personal card 5B from the IC card reader/writer 2.

Referring back to FIG. 13, the access control portion 125 performs a control process for a case in which a visiting employee uses the image forming apparatus 1B. The log record processing portion 126 generates log data 7C indicating a record of the use of the image forming apparatus 1B by the visiting employee, e.g., the details of jobs, a second authentication key 8KB of the visiting employee, and a first authentication key 8KA corresponding to the second authentication key 8KB, and stores the log data 7C in the log database 1L4. The access right updating portion 128 performs a process for updating access right data 8US stored on a personal card 5B.

The following is a description of the processes performed by the access control portion 125, the log record processing portion 126, and the access right updating portion 128 with reference to FIG. 17, taking an example in which the user Ux uses the image forming apparatus 1B.

After permission to use the image forming apparatus 1B is registered, the user Ux brings his/her personal card 5B into contact with a predetermined position of the IC card reader/writer 2. Then, the IC card reader/writer 2 reads out the second authentication key 8KB and the access right data 8US stored on the personal card 5B. The authentication key obtaining portion 121 obtains the second authentication key 8KB and the access right data 8US thus read out (#651 of FIG. 17).

The card type determination portion 122 determines that the type of the personal card 5B as the read source is a personal card 5B of a visiting employee (#652).

Responding to this, the access control portion 125 performs a process for determining whether or not logging onto the image forming apparatus 1B is allowed and also performs a process for access control in the following manner.

The access control portion 125 compares a character string corresponding to the high-order fixed length La of the second authentication key 8KB with a character string of a first authentication key 8KA included in any one piece of registration card data 7S, and checks whether or not a requirement that a match is found therebetween is satisfied (#653). Then, the access control portion 125 compares a value indicated in the "ISSUED AMOUNT" field corresponding to the matched first authentication key 8KA with a value indicated in a character string corresponding to the low-order predetermined length La of the second authentication key 8KB, and checks whether or not a requirement that the latter is equal to or smaller than the former is satisfied (#654). Further, the access control portion 125 checks whether or not a requirement that the access right is still valid is satisfied with reference to the access right data 8US (#655). Moreover, the access control portion 125 checks whether or not a requirement that a value indicated in the "NUMBER OF USES LEFT" field of the access right data 8US is equal to or greater than "1" is satisfied (#656).

If all the three requirements described above are satisfied, then the access control portion 125 allows the user Ux to log onto the image forming apparatus 1B, and the image forming apparatus 1B executes a process (job) within the access right indicated in the access right data 8US in accordance with a command issued by the user Ux (#657). Then, every time when a job is executed, the log record processing portion 126 generates log data 7C including the details of the job and a personal card identification code 8CB of the user Ux, and stores the log data 7C in the log database 1L4.

When leaving the place where the image forming apparatus 1B is installed, the user Ux presses a log-out button. Responding to this, the message display control portion 123 causes the touch screen 10h to display a message requesting that the personal card 5B of the user Ux be kept in contact with a predetermined position of the IC card reader/writer 2 (#658).

When the IC card reader/writer 2 reads out the personal card identification code 8CB from the personal card 5B, and the authentication key obtaining portion 121 obtains the personal card identification code 8CB from the IC card reader/writer 2 (#659), the card type determination portion 122 confirms that the personal card 5B is possessed by the User Ux. The access right updating portion 128 controls the IC card reader/writer 2 in such a manner that a value of the "NUMBER OF USES LEFT" indicated in the access right data 8US stored on the personal card 5B is updated (reduced) depending on how many times the user Ux has caused the image forming apparatus 1B to execute jobs (#660).

The message display control portion 123 causes the touch screen 10h to display a message indicating that the access right data 8US has been completely updated (#661). Once this message is displayed, the user Ux may release the personal card 5B from the IC card reader/writer 2.

Referring back to FIG. 13, the registration deletion processing portion 127 performs a process for deleting registered permission for a visiting employee to use the image forming apparatus 1B in the following manner.

If a system administrator or a supervisory manager of the Y-branch specifies a registration card identification code 8CA and enters a command to invalidate a registration card 5A into the image forming apparatus 1B, then the registration deletion processing portion 127 searches for registration card data 7S (see FIG. 15) including the registration card identification code 8CA thus specified. Then, the registration deletion processing portion 127 deletes the registration card data 7S found by the search from the visiting employee user database 1K2.

This makes it impossible to perform authentication using the second authentication key 8KB corresponding to the first authentication key 8KA indicated in the deleted registration card data 7S.

Figure 18:
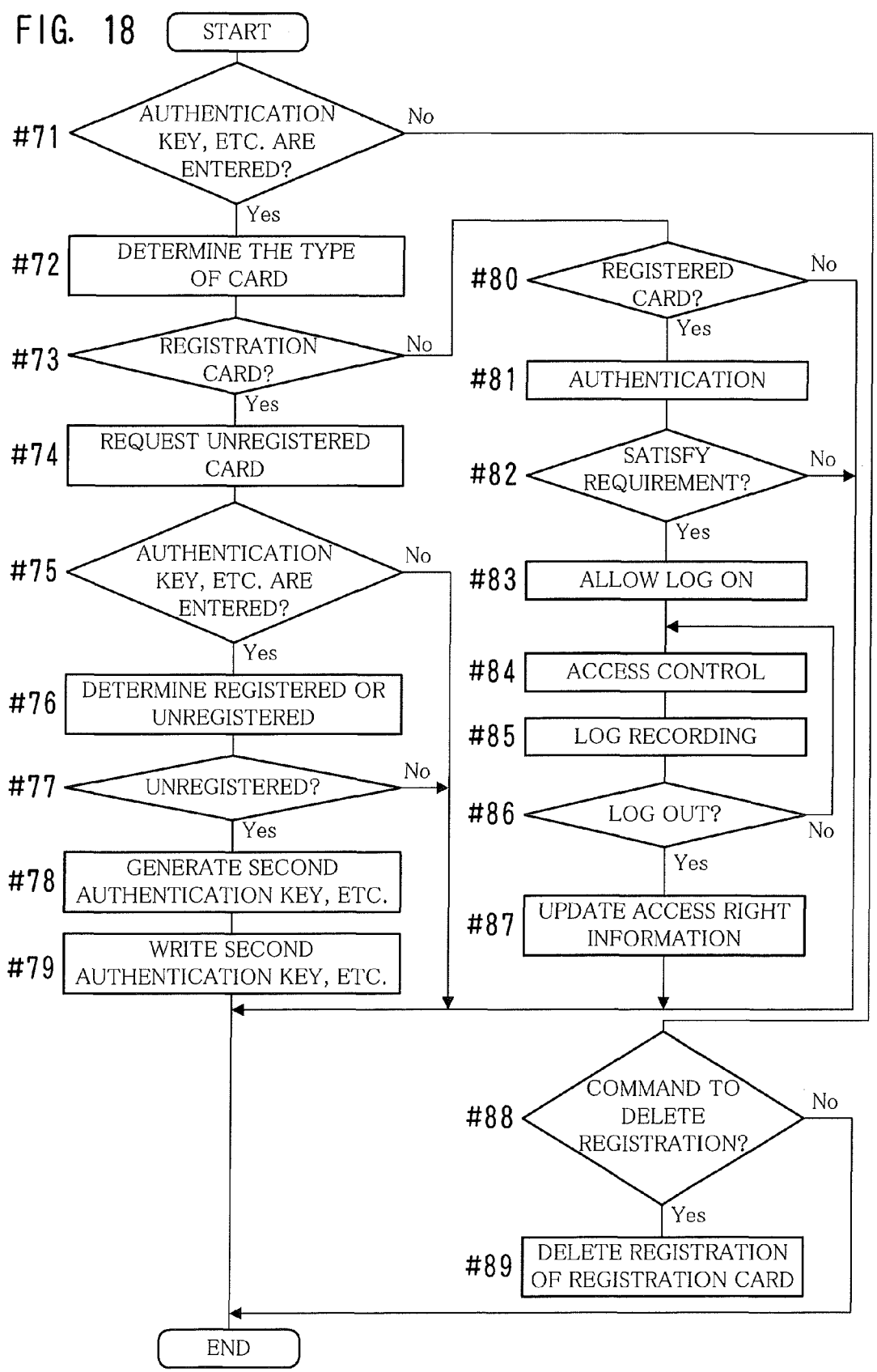
FIG. 18 is a flowchart illustrating an example of the overall processing flow of an image forming apparatus for a visiting employee.

FIG. 18 is a flowchart illustrating an example of the overall processing flow of the image forming apparatus 1B for a visiting employee.

The following is a description of the overall processing flow of the image forming apparatus 1B with reference to the flowchart in FIG. 18.

When an authentication key and the like that have been read out from an IC card by the IC card reader/writer 2 are entered into the image forming apparatus 1B (Yes in #71 of FIG. 18), the image forming apparatus 1B determines a type of the IC card (#72).

If the IC card is determined to be a registration card (Yes in #73), then the image forming apparatus 1B displays a message requesting that a personal card 5B of a user who desires permission to temporarily use the image forming apparatus 1B be brought into contact with a predetermined position of the IC card reader/writer (#74).

The image forming apparatus 1B waits for a predetermined amount of time, e.g., thirty seconds, to elapse after the message has been displayed. If data is read out from an IC card by the IC card reader/writer 2 before the predetermined amount of time has elapsed, and is entered into the image forming apparatus 1B (Yes in #75), then the image forming apparatus 1B determines whether the type of the IC card is a personal card of a visiting employee, and whether the IC card is unregistered, i.e., the IC card does not store thereon the second authentication key 8KB (#76).

If the type of the IC card is determined to be a personal card of a visiting employee, and the IC card (personal card 5B) is unregistered (Yes in #77), then the image forming apparatus 1B uses the first authentication key 8KA obtained earlier and registration card data 7S (FIG. 15) corresponding thereto to newly generate a second authentication key 8KB and access right data 8US (#78), and writes, onto the personal card 5B, the second authentication key 8KB and the access right data 8US (#79).

Note that, also in the case where a personal card 5B stores, thereon, an expired second authentication key 8KB, it is possible to determine that the IC card (personal card 5B) is unregistered. In such a case, the second authentication key 8KB and the access right data 8US that are currently stored on the personal card 5B are deleted, and a second authentication key 8KB and access right data 8US are newly generated and are written onto the personal card 5B.

If the image forming apparatus 1B determines, in Step #72, that a type of the IC card from which the data and the like have been read out is a personal card of a visiting employee (No in #73), then the image forming apparatus 1B performs a process for managing the use thereof in the following manner.

If the image forming apparatus 1B successfully obtains the second authentication key 8KB and the access right data 8US from the IC card (personal card 5B) (Yes in #80), then the image forming apparatus 1B performs user authentication by checking the validity of the second authentication key 8KB and the like (#81). If a necessary requirement is satisfied (Yes in #82), then the image forming apparatus 1B allows the user to log onto the same (#83), and executes a process (job) within the access right indicated in the access right data 8US (#84). Then, upon executing a job, the image forming apparatus 1B generates log data 7C and stores the log data 7C (#85).

When the user logs out of the image forming apparatus 1B (Yes in #86), the image forming apparatus 1B reduces a value of the "NUMBER OF USES LEFT" indicated in the access right data 8US stored on the personal card 5B of the user depending on how many times the user has caused the image forming apparatus 1B to execute jobs (#87).

Further, when a registration card identification code 8CA is specified and a command to invalidate a registration card 5A is entered into the image forming apparatus 1 (Yes in #88), the image forming apparatus 1B deletes registration card data 7S including the registration card identification code 8CA (#89).

According to the first and second embodiments, in a system for performing user authentication by using a portable recording medium such as an IC card, it is possible to grant an access right to a user who temporarily uses such a system more easily than is conventionally possible.

In the embodiments discussed above, a dedicated IC card (registration card 5A) is used as an IC card for registration. Instead, however, a personal card 5B of a supervisory manager may be used as an IC card for registration. In such a case, the personal card 5B of the supervisory manager stores, thereon, a registration card identification code 8CA in addition to a personal card identification code 8CB, and then the personal card 5B of the supervisory manager may be properly used as follows.

In the case where the supervisory manager uses his/her personal card 5B to log onto the image forming apparatus 1 or 1B, he/she presses a predetermined button, e.g., a log-on button, of the IC card reader/writer 2, and then causes the IC card reader/writer 2 to read the personal card 5B. Responding to this, the IC card reader/writer 2 reads out the personal card identification code 8CB from the personal card 5B.

In contrast, in the case where a visiting employee borrows the personal card 5B from the supervisory manager to use the personal card 5B for user registration, the visiting employee presses another button, e.g., a registration button, of the IC card reader/writer 2, and then causes the IC card reader/writer 2 to read the personal card 5B. Responding to this, the IC card reader/writer 2 reads out the registration card identification code 8CA from the personal card 5B.

In the embodiments discussed above, a process for registering a visiting employee as a user is performed by means of the IC card reader/writer 2 coupled to the image forming apparatus 1 or 1B. Instead, however, another configuration is possible in which an IC card reader/writer is coupled to a personal computer 3 of a supervisory manager and a process for registering a visiting employee as a user is performed by means of the IC card reader/writer.

For example, when a visiting employee asks a supervisory manager for permission to use the image forming apparatus 1 or 1B, the supervisory manager receives a personal card 5B of the visiting employee. The supervisory manager brings his/her registration card 5A and the personal card 5B thus received into contact with the IC card reader/writer coupled to his/her personal computer 3. Responding to this, the IC card reader/writer reads out a registration card identification code 8CA and a personal card identification code 8CB respectively from the registration card 5A and the personal card 5B. The registration card identification code 8CA and the personal card identification code 8CB thus read out are then transmitted via the personal computer 3 and the communication line to the image forming apparatus 1 or 1B. Then, a process for user registration is performed in the image forming apparatus 1 or 1B.

[Application to System/Device Other than Image Forming Apparatus]

Figure 19:
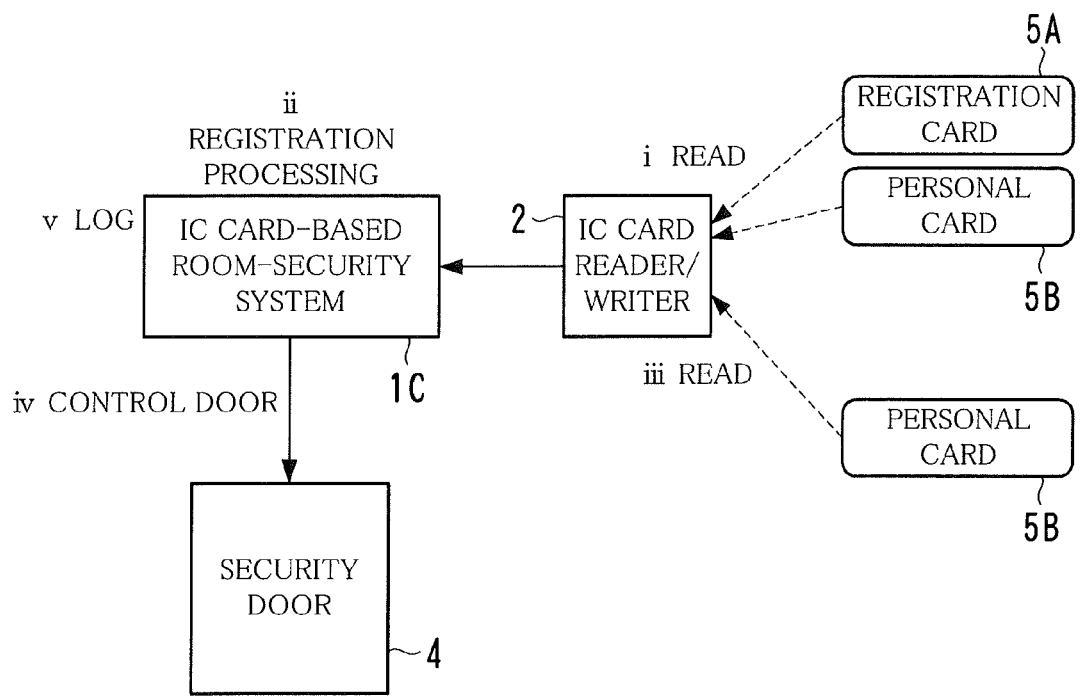
FIG. 19 is a diagram depicting an example in which the present invention is applied to an IC card-based room-security system.
Figure 20:
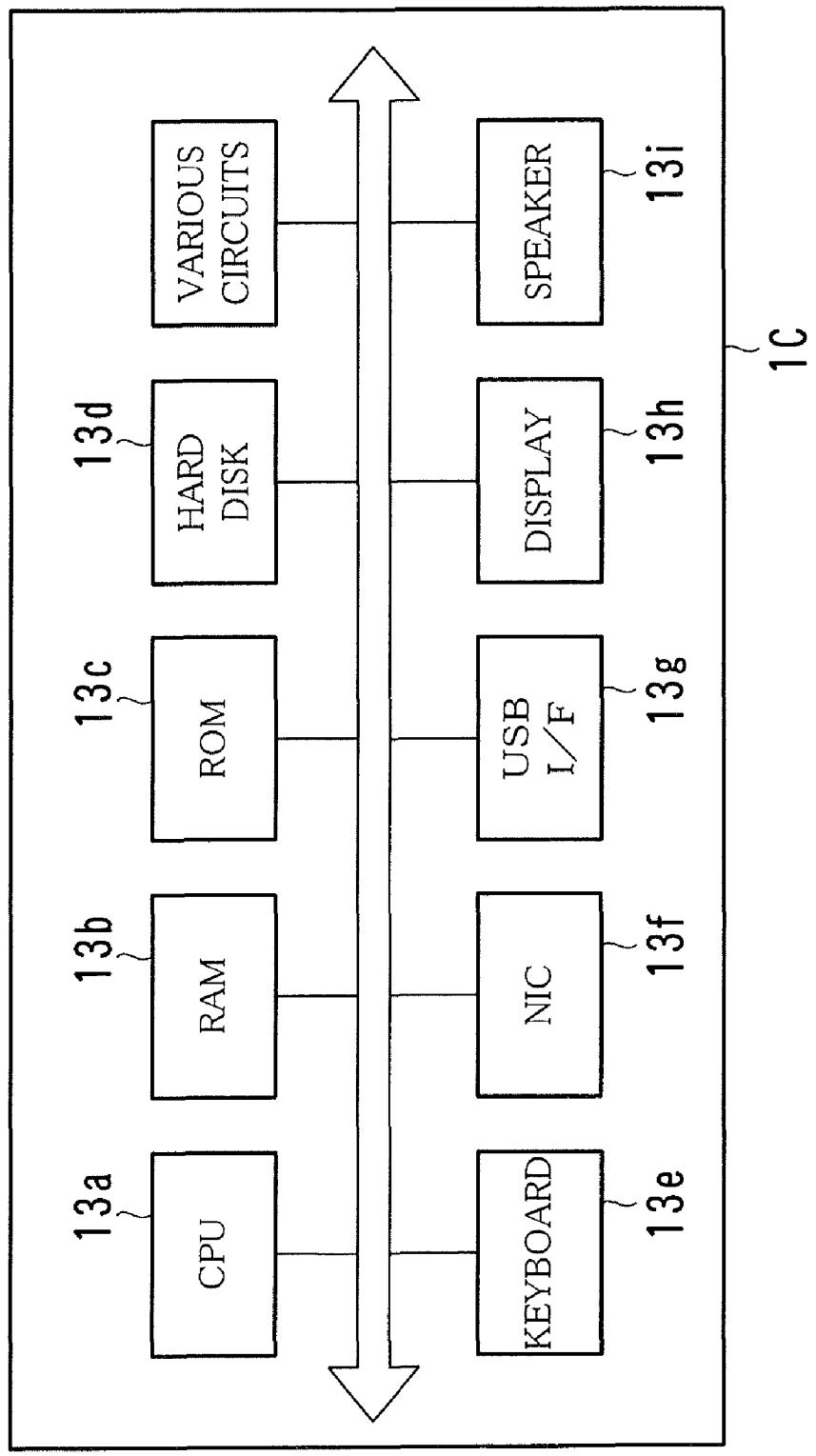
FIG. 20 is a diagram illustrating an example of the hardware configuration of an IC card-based room-security system.
Figure 21:
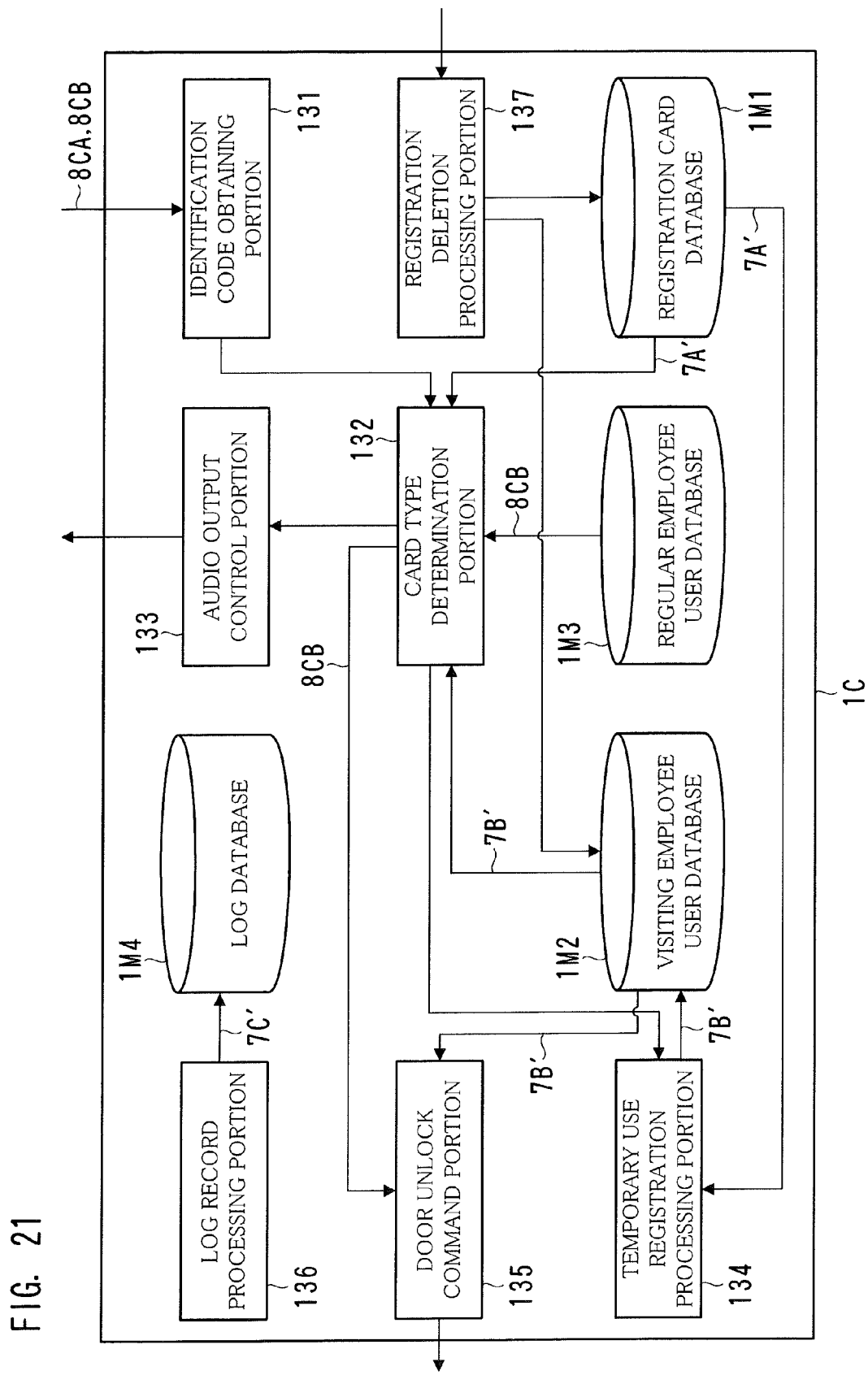
FIG. 21 is a diagram illustrating an example of the functional configuration of an IC card-based room-security system.

FIG. 19 is a diagram depicting an example in which the present invention is applied to an IC card-based room-security system 1C; FIG. 20 is a diagram illustrating an example of the hardware configuration of the IC card-based room-security system 1C; and FIG. 21 is a diagram illustrating an example of the functional configuration of the IC card-based room-security system 1C.

In the first and second embodiments, the case of registering an access right to the image forming apparatus 1 or 1B is described. In addition, however, the present invention is applicable to the case of registering an access right to another resource. The present invention is applicable, for example, to the case of registering an access right to a personal computer, a file server, or a variety of software.

The present invention is also applicable to a system for managing entering and leaving a facility. The following is a description of the case where the present invention is applied to the IC card-based room-security system 1C for managing entering and leaving a Z-room of a Y-branch.

Referring to FIG. 20, the IC card-based room-security system 1C is configured of a Central Processing Unit (CPU) 13a, a Random Access Memory (RAM) 13b, a Read-Only Memory (ROM) 13c, a hard disk 13d, a keyboard 13e, a Network Interface Card (NIC) 13f, a Universal Serial Bus (USB) interface 13g, a display 13h, a speaker 13i, and so on.

Referring to FIG. 19, the IC card-based room-security system 1C is coupled to the IC card reader/writer 2 and a security door 4 via the NIC 13f or the USB interface 13g.

Referring to FIG. 21, the hard disk 13d stores programs for implementing functions of an identification code obtaining portion 131, a card type determination portion 132, an audio output control portion 133, a temporary use registration processing portion 134, a door unlock command portion 135, a log record processing portion 136, a registration deletion processing portion 137, a registration card database 1M1, a visiting employee user database 1M2, a regular employee user database 1M3, a log database 1M4, and the like. These programs are loaded into the RAM 13b as necessary, whereupon the programs are executed by the CPU 13a.

The whole or a part of the functions of the individual portions illustrated in FIG. 21 may be implemented merely by hardware such as a circuit.

The IC card reader/writer 2 is placed in the vicinity of the security door 4 that is installed in the doorway to the Z-room.

In the case where a person who is to go out of the Z-room approaches the security door 4, an optical sensor or the like detects the person, so that the security door 4 is unlocked. Then, after the person has left the Z-room, the security door 4 is locked.

However, even if a person who is to go into the Z-room approaches the security door 4, the security door 4 remains locked and is not opened. A person who is to go into the Z-room is required to complete user registration in advance and cause the IC card reader/writer 2 to read his/her personal card 5B.

In this example, employees of the Y-branch are registered as users in advance; however employees belonging to bases other than the Y-branch are not registered as users. Accordingly, a process and operation for user registration is performed in the following manner.

In the case where, for example, a user Ux corresponding to an employee who has visited the Y-branch on a business trip from another base needs to enter the Z-room, he/she informs a supervisory manager of the Y-branch accordingly and borrows a registration card 5A from the supervisory manager.

The user Ux brings the registration card 5A and his/her personal card 5B into contact with the IC card reader/writer 2.

Responding to this, the IC card reader/writer 2 reads out a registration card identification code 8CA and a personal card identification code 8CB respectively from the registration card 5A and the personal card 5B ("i" in FIG. 19).

The identification code obtaining portion 131 of the IC card-based room-security system 1C obtains, from the IC card reader/writer 2, the registration card identification code 8CA and the personal card identification code 8CB thus read out. The card type determination portion 132 determines the type of the IC card as the read source. Then, as with the temporary use registration processing portion 104 (see FIG. 3) of the first embodiment, the temporary use registration processing portion 134 performs a process for registering the user Ux ("ii" in FIG. 19).

The visiting employee user database 1M2 registers, therein, visiting employee user data 7B' instead of the visiting employee user data 7B (see FIG. 5) of the first embodiment. The visiting employee user data 7B' includes information on the personal card identification code 8CB of the user Ux, the registration card identification code 8CA of the registration card 5A used for actual registration, expiration date and time of the actual registration, how many more times the user Ux is allowed to enter the Z-room (the number of entries left), and a period of day during which the user Ux is allowed to enter the Z-room. Further, the registration card database 1M1 registers, therein, registration card data 7A' instead of the registration card data 7A (see FIG. 4) of the first embodiment. The registration card data 7A' includes information on the registration card identification code 8CA, a period during which the user Ux is allowed to enter the Z-room, how many times the user Ux is allowed to enter the Z-room, and a period of day during which the user Ux is allowed to enter the Z-room.

After undergoing the process of registration as a user, the user Ux causes the IC card reader/writer 2 to read his/her personal card 5B, thereby to enter the Z-room.

When the IC card reader/writer 2 reads out the personal card identification code 8CB from the personal card 5B of the user Ux ("iii" in FIG. 19), the door unlock command portion 135 of the IC card-based room-security system 1C checks whether or not visiting employee user data 7B' corresponding to the personal card identification code 8CB is registered. Then, if such visiting employee user data 7B' is registered and still valid, if the current time falls within the period of day during which the user Ux is allowed to enter the Z-room, and if the current value indicated in the number of entries left is "1" or more, then the door unlock command portion 135 issues a command to unlock the security door 4 ("iv" in FIG. 19).

Responding to this, the security door 4 is unlocked. Then, after the user Ux has entered the Z-room, the security door 4 is locked. The log record processing portion 136 logs a record appropriately, as with the log record processing portion 106 of the first embodiment ("v" in FIG. 19).

The audio output control portion 133 beeps in accordance with each of the cases where registration has been completed, registration has failed, the security door 4 has been unlocked, user authentication has failed, and the like.

The functions and processes performed by the registration deletion processing portion 137, the regular employee user database 1M3, and the log database 1M4 are, respectively, similar to those of the registration deletion processing portion 107, the regular employee user database 1K3, and the log database 1K4 of the first embodiment.

The overall processing flow of the IC card-based room-security system 1C is basically the same as that of the image forming apparatus 1 described earlier with reference to FIG. 12.

In the embodiments discussed above, an IC card is used as a recording medium for recording, for example, the registration card identification code 8CA and the personal card identification code 8CB. Instead, however, a magnetic card, a USB memory, or the like may be used as such a recording medium.

In the embodiments discussed above, the overall configurations of the image forming apparatuses 1 and 1B, and the IC card-based room-security system 1C, the configurations of various portions thereof, the content to be processed, the processing order, the configuration of the databases, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A method for managing a resource, the method comprising:
   a step of providing a user with a first portable recording medium recording, thereon, a user identification code for identifying the user;
   a step of providing a second portable recording medium recording, thereon, a registration code and at least one access right condition on the resource that corresponds to the registration code;
   in response to the user identification code and the registration code being read out, for user registration, from the first portable recording medium and the second portable recording medium respectively during a predetermined period, a step of generating and storing data in a storage portion, the generated data including the user identification code associated with the registration code or the at least one access right condition on the resource that corresponds to the registration code; and
   a step of forbidding the user to access the resource if the user identification code is read out from the first portable recording medium in order for the user to use the resource and the user identification code thus read out is not stored in the generated data of the storage portion.

2. The method according to claim 1, wherein
   the step of storing includes storing, in the storage portion, the user identification code in association with the registration code that has been read out simultaneously with the user identification code during the predetermined period, and
   after specifying a registration code to be invalidated, the step of forbidding includes, if the user identification code read out from the first portable recording medium is associated with the registration code to be invalidated, forbidding the user to access the resource independent of whether or not the user identification code is stored in the generated data of the storage portion.

3. The method according to claim 2, further comprising a step of presetting an access right to the resource per the second portable recording medium,
   wherein the method further comprises allowing or forbidding the user to access the resource based on the at least one access right condition preset on the second portable recording medium corresponding to the registration code associated with the user identification code or the at least one access right condition in the generated data stored in the generated data of the storage portion if the user identification code thus read out is stored in the generated data of the storage portion.

4. A method for managing a resource, the method comprising:

a step of providing a first portable recording medium recording, thereon, a first key;

a step of providing a user with a second portable recording medium;

a step of storing, in a key storage portion, the first key that is currently valid;

a step of generating a second key corresponding to the first key recorded on the first portable recording medium, and recording the second key and the first key that corresponds to the second key onto the second portable recording medium when the first portable recording medium and the second portable recording are set, for user registration, on a reader/writer during a predetermined period; and a step of allowing the user to access the resource if the second key is read out from the second portable recording medium in order for the user to use the resource and the first key corresponding to the second key is stored in the key storage portion, and forbidding the user to access the resource if the second key is read out from the second portable recording medium in order for the user to use the resource and the first key corresponding to the second key is not stored in the key storage portion.

5. An apparatus for managing a resource, the apparatus comprising:

a user usage data generation portion that generates data to include a user identification code for identifying a user and a registration code for registering the user that is associated with the user identification code, when the user identification code and the registration code are read out from a first portable recording medium of the user and a second portable recording medium respectively during a predetermined period;

a user storage portion which stores the generated data; and a control portion that forbids the user to access the resource if the user identification code is read out from the first portable recording medium in order for the user to use the resource and the user identification code thus read out is not stored in generated data of the user storage portion.

6. The apparatus according to claim 5, wherein the user storage portion stores the user identification code in association with the registration code that has been read out simultaneously with the user identification code, and after specifying a registration code to be invalidated, the control portion forbids, if the user identification code read out from the first portable recording medium is associated with the registration code to be invalidated, the user to access the resource independent of whether or not the user identification code is stored in the user storage portion.

7. The apparatus according to claim 6, further comprising an access right storage portion that stores an access right to the resource per the second portable recording medium, wherein the control portion allows or forbids the user to access the resource based on the access right stored on the second portable recording medium corresponding to the registration code associated with the user identification code if the user identification code thus read out is stored in the user storage portion.

8. An apparatus for managing a resource, the apparatus comprising:

a registration process portion that, when a first portable recording medium storing, thereon, a first key and a second portable recording medium of a user are set, for registering the user, on a reader/writer during a predetermined period, generates a second key corresponding to the first key and records the second key and the first key in association with each other onto the second portable recording medium;

a key storage portion that stores the first key that is currently valid; and a control portion that allows the user to access the resource if the second key is read out from the second portable recording medium in order for the user to use the resource and the first key corresponding to the second key is stored in the key storage portion, and forbids the user to access the resource if the second key is read out from the second portable recording medium in order for the user to use the resource and the first key corresponding to the second key is not stored in the key storage portion.

9. A non-transitory computer-readable storage medium storing thereon a computer program used in a computer for managing a resource, the computer program causing the computer to perform:

a registration process of generating data associating a user identification code for identifying a user and a registering code for registering the user, when the user identification code and the registration code are read out from a first portable recording medium of the user and a second portable recording medium respectively during a predetermined period; and a storing process of storing the generated data;

an access control process of forbidding the user to access the resource if the user identification code is read out from the first portable recording medium in order for the user to use the resource and the user identification code thus read out is not stored in the generated data of the user storage portion.

10. The non-transitory computer-readable storage medium according to claim 9, wherein the user identification code and the registration code are read out simultaneously, and after specifying a registration code to be invalidated, the access control process includes, if the user identification code read out from the first portable recording medium is associated with the registration code to be invalidated, forbidding the user to access the resource independent of whether or not the user identification code is stored in the generated data of the user storage portion.

11. The non-transitory computer-readable storage medium according to claim 10, the computer program causing the computer to further perform a read process of reading out, from an access right storage portion that stores an access right to the resource per the registration code, the access right corresponding to any one of the registration codes that have been read out, wherein the computer is caused to perform the access control process based on the access right read out in the read process.

12. A non-transitory computer-readable storage medium storing thereon a computer program used in a computer for managing a resource, the computer program causing the computer to perform:

a user registration process of, when a first portable recording medium storing, thereon, a first key and a second portable recording medium of a user are set, for registering the user, on a reader/writer during a predetermined period, generating a second key corresponding to the first key and recording the second key and the first key that corresponds to the second key in association with each other onto the second portable recording medium;

a key registration process of storing, in a key storage portion, the first key that is currently valid; and an access control process of allowing the user to access the resource if the second key is read out from the second portable recording medium in order for the user to use the resource and the first key corresponding to the second key is stored in the key storage portion, and forbidding the user to access the resource if the second key is read out from the second portable recording medium in order for the user to use the resource and the first key corresponding to the second key is not stored in the key storage portion.

* * * * *